United States Patent
Brun et al.

(10) Patent No.: US 10,150,862 B2
(45) Date of Patent: Dec. 11, 2018

(54) TRANSESTERIFIED FURAN BASED POLYESTERS AND ARTICLES MADE THEREFROM

(71) Applicant: E I DU PONT DE NEMOURS AND COMPANY, Wilmington, DE (US)

(72) Inventors: Yefim Brun, Wilmington, DE (US); Alicia Maria Castagna, Glen Mills, PA (US); Ken-Hsuan Liao, Hockessin, DE (US); Fredrik Nederberg, East Amherst, NY (US); Elizabeth Forrester McCord, Hockessin, DE (US); Christopher John Rasmussen, Chadds Ford, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/307,995

(22) PCT Filed: May 1, 2015

(86) PCT No.: PCT/US2015/028807
§ 371 (c)(1),
(2) Date: Oct. 31, 2016

(87) PCT Pub. No.: WO2015/168563
PCT Pub. Date: Nov. 5, 2015

(65) Prior Publication Data
US 2017/0058119 A1   Mar. 2, 2017

Related U.S. Application Data

(60) Provisional application No. 61/987,031, filed on May 1, 2014.

(51) Int. Cl.
| | | |
|---|---|---|
| *C08L 67/02* | (2006.01) |
| *B32B 27/08* | (2006.01) |
| *B32B 27/36* | (2006.01) |
| *B32B 27/20* | (2006.01) |
| *B32B 1/08* | (2006.01) |
| *B32B 1/02* | (2006.01) |
| *C08J 3/00* | (2006.01) |
| *C08L 67/00* | (2006.01) |

(52) U.S. Cl.
CPC .............. *C08L 67/02* (2013.01); *B32B 1/02* (2013.01); *B32B 1/08* (2013.01); *B32B 27/08* (2013.01); *B32B 27/20* (2013.01); *B32B 27/36* (2013.01); *C08J 3/005* (2013.01); *C08L 67/00* (2013.01); *B32B 2270/00* (2013.01); *B32B 2307/7242* (2013.01); *B32B 2307/7244* (2013.01); *B32B 2307/7246* (2013.01); *B32B 2439/02* (2013.01); *B32B 2439/40* (2013.01); *B32B 2439/70* (2013.01); *B32B 2597/00* (2013.01); *C08J 2367/00* (2013.01); *C08J 2367/02* (2013.01); *C08J 2467/02* (2013.01); *C08L 2201/14* (2013.01); *C08L 2203/10* (2013.01); *C08L 2203/16* (2013.01); *C08L 2205/025* (2013.01)

(58) Field of Classification Search
CPC .... C08L 67/00; C08L 67/02; C08L 2205/025; C08L 2205/10; C08L 2201/14; C08L 2203/16; C08J 3/005; C08J 2367/00; C08J 2367/02; C08J 2467/02; B32B 27/36; B32B 2307/7244
See application file for complete search history.

(56) References Cited

U.S. PATENT DOCUMENTS

2014/0205786 A1* 7/2014 Nederberg ............... C08J 5/18
428/36.92

FOREIGN PATENT DOCUMENTS

WO   WO2013149221 A1 * 10/2013

* cited by examiner

*Primary Examiner* — Robert Jones, Jr.

(57) ABSTRACT

Transesterified-blend compositions comprising transesterified furan-based polyester and transesterified terephthalate-based polyester disclosed herein and articles made therefrom.

15 Claims, 7 Drawing Sheets

TRANSESTERIFIED FURAN BASED POLYESTERS AND ARTICLES MADE THEREFROM

CROSS-REFERENCE TO RELATED APPLICATION

This application claims the benefit of U.S. Provisional Application No. 61/987,031 filed on May 1, 2014, which is incorporated herein by reference in their entirety.

FIELD OF THE INVENTION

This present disclosure relates in general to compositions comprising a transesterified furan-based polyester and a transesterified terephthalate-based polyester and articles made therefrom.

BACKGROUND

Gas barrier properties are one of the key requirements for polymers used in packaging applications to protect the contents and provide desired shelf-life. The prevention of oxygen permeation, for example inhibits oxidation and microbial growth, whereas prevention of water vapor permeation retains liquid content. Many polymers have emerged for these applications such as poly(ethylene terephthalate) (PET), polyethylene (PE), poly(vinyl alcohol) (PvOH), ethylene vinyl alcohol polymer (EvOH), poly(acrylonitrile) (PAN), poly(ethylene naphthalene) (PEN), polyamide derived from adipic acid and m-xylenediamine (MXD6) and poly(vinylidene chloride) (PVdC), and may include additives to enhance barrier properties. However, most of these polymers suffer from various drawbacks. For example, high density polyethylene (HDPE) and low density polyethylene (LDPE) have fair water vapor barrier, but poor oxygen barrier. EvOH exhibits good oxygen barrier at low humidity levels but fails at high levels of humidity. PET has relatively high tensile strength but is limited by low gas barrier properties. Blending PET with high barrier polymers such as poly(trimethylene furandicarboxylate) (PTF) is a solution to reducing resin cost while still potentially improving barrier properties and has been reported in literature. However, chemical incompatibility can lead to phase separation and inhomogeneous physical properties.

Hence, there is a need for new compositions comprising transesterified furan-based polyesters formed by melt blending of poly(alkylene furandicarboxylate) with poly(alkylene terephthalate) that can enhance chemical compatibility and provide distinct properties over physical blends.

SUMMARY OF THE INVENTION

In a first embodiment, there is a composition comprising:
a. a transesterified furan-based polyester comprising a first-alkylene furandicarboxylate repeat unit ($R^1F$) and one or more of a second-alkylene furandicarboxylate repeat unit ($R^2F$), a first-alkylene terephthalate repeat unit ($R^1T$), and a second-alkylene terephthalate repeat unit ($R^2T$); and
b. a transesterified terephthalate-based polyester comprising second-alkylene terephthalate repeat unit ($R^2T$) and one or more of a first-alkylene terephthalate repeat unit ($R^1T$), a second-alkylene furan repeat unit ($R^2F$), and a first-alkylene furandicarboxylate repeat units ($R^1F$);

wherein the first-alkylene group ($R^1$) and the second-alkylene group ($R^2$) are independently selected from a $C_2$ to $C_{12}$ aliphatic group, and
wherein the composition has an NMR blockiness index of greater than 0.00 and less than 1.00

In a second embodiment, the composition shows a shift in one or more elution times as measured by interaction polymer chromatography, from at least one of:
a corresponding untransesterified furan-based polyester comprising the first-alkylene furandicarboxylate repeat units ($R^1F$), or
a corresponding untransesterified terephthalate-based polyester comprising the second-alkylene terephthalate repeat unit ($R^2T$), poly(second-alkylene terephthalate).

In a third embodiment, the transesterified furan-based polyester is present in an amount in the range of 0.1-99.9 weight %, based on the total weight of the composition.

In a fourth embodiment, the composition further comprises another transesterified furan-based polyester comprising a third-alkylene furandicarboxylate repeat unit ($R^3F$), and one or more of a first-alkylene furandicarboxylate repeat unit ($R^1F$), a second-alkylene furandicarboxylate repeat unit ($R^2F$), a third-alkylene terephthalate repeat unit ($R^3T$), and a second-alkylene terephthalate repeat unit ($R^2T$),
wherein the third-alkylene group ($R^3$) is selected from a $C_2$ to $C_{12}$ aliphatic group.

In a fifth embodiment of the composition, the composition further comprises another transesterified terephthalate-based polyester comprising a fourth-alkylene terephthalate repeat unit ($R^4T$) and one or more of a first-alkylene terephthalate repeat unit ($R^1T$), second-alkylene terephthalate repeat unit ($R^2T$), a fourth-alkylene furandicarboxylate repeat unit ($R^4F$), and a first-alkylene furandicarboxylate repeat unit ($R^1F$),
wherein the fourth-alkylene group ($R^4$) is selected from a $C_2$ to $C_{12}$ aliphatic group.

In a sixth embodiment of the composition, $R^1$ is a trimethylene group and $R^2$ is an ethylene group, such that:
i. the first-alkylene furandicarboxylate repeat unit ($R^1F$) is trimethylene furandicarboxylate repeat unit (3F),
ii. the second-alkylene furandicarboxylate repeat units ($R^2F$) is ethylene furandicarboxylate repeat units (2F),
iii. the first-alkylene terephthalate repeat unit ($R^1T$) is trimethylene terephthalate repeat unit (3T),
iv. the second-alkylene terephthalate repeat unit ($R^2T$) is ethylene terephthalate repeat unit (2T),
v. the transesterified furan-based polyester is transesterified poly(trimethylene furandicarboxylate) (t-PTF),
vi. the transesterified terephthalate-based polyester is transesterified poly(ethylene terephthalate) (t-PET), and
vii. the corresponding untransesterified furan-based polyester is poly(trimethylene furandicarboxylate) (PTF).

In a seventh embodiment, the composition further comprises an effective amount of a transesterification inhibitor or a transesterification catalyst.

In an eighth embodiment, there is an article comprising the composition, wherein the article is in the form of a sheet, a film or a molded article.

In a ninth embodiment, the composition provides a substantial gas barrier to at least one of oxygen, carbon dioxide or moisture.

In a tenth embodiment, the article is a beverage container.

In an eleventh embodiment, the composition is in at least one of a barrier layer or a structural layer of the multilayer structure.

In a twelfth embodiment, the multilayer structure is in a form of a housing provided with a port for introducing a chemical in an enclosure defined by the housing.

In a thirteenth embodiment, the multilayer structure is in a form of a hollow body selected from a group consisting of a hose, a pipe, a duct, a tube, a tubing or a conduit.

In a fourteenth embodiment, there is a method of improving gas barrier properties of a composition comprising a terephthalate-based polyester, the method comprising the step of:

melt blending 0.1-99.9% by weight of a poly(first-alkylene furandicarboxylate) ($PR^1F$) with 0.1-99.9% by weight of a poly(second-alkylene terephthalate) ($PR^2T$) at a melt blending temperature and a melt blending time to form a transesterified blend composition, wherein the melt blending time is minimum time required for the transesterified blend composition to have a desired amount of transesterification, as determined by at least one of:

an NMR blockiness index of less than 1.00, or a shift in one or more IPC elution times from at least one of the poly(first-alkylene furandicarboxylate) or poly(second-alkylene terephthalate), and wherein the melt blending temperature is in the range of extrusion processing temperatures of the poly(first-alkylene furandicarboxylate) and the poly(second-alkylene terephthalate), wherein the poly(first-alkylene furandicarboxylate) ($PR^1F$) is derived from 2,5-furan dicarboxylic acid or a derivative thereof and at least one of a $C_2$ to $C_{12}$ aliphatic diol or a polyol monomer, and optionally at least one of a polyfunctional aromatic acid or a hydroxyl acid, and wherein the poly(second-alkylene terephthalate) is derived from a terephthalic acid or a derivative thereof, a $C_2$-$C_{12}$ aliphatic diol or a polyol monomer and optionally isophthalic acid or a derivative thereof.

In a fifteenth embodiment, the step of melt blending 0.1-99.9% by weight of a poly(first-alkylene furandicarboxylate) ($PR^1F$) with 0.1-99.9% by weight of a poly(second-alkylene terephthalate) ($PR^2T$) is carried out in the presence of an effective amount of a transesterification inhibitor or a transesterification catalyst to further control the transesterification, and thereby blockiness index.

BRIEF DESCRIPTION OF THE DRAWINGS

The invention is illustrated by way of example and not limited to the accompanying figures.

DETAILED DESCRIPTION

Figure 1:
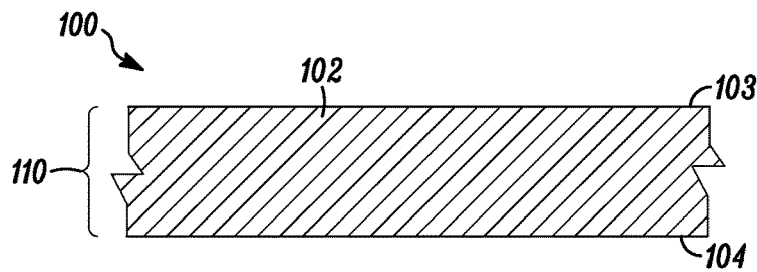
FIG. 1 schematically illustrates a cross-sectional view of a portion of an exemplary article comprising a substrate comprising a polymer comprising poly(trimethylene-2,5-furandicarboxylate), in accordance with the present invention.

When a range of values is provided herein, it is intended to encompass the end-points of the range unless specifically stated otherwise. Numerical values used herein have the precision of the number of significant figures provided, following the standard protocol in chemistry for significant figures as outlined in ASTM E29-08 Section 6. For example, the number 40 is encompassed within a range from 35.0 to 44.9, whereas the number 40.0 is encompassed with a range from 39.50 to 40.49. When it is stated that a value is "greater than" or "less than" a number, that number is not intended to be encompassed. For example, a value "greater than 1" is not equal to 1, unless specifically stated otherwise.

As used herein, the term "biologically-derived" is used interchangeably with "biobased" or "bio-derived" and refers to chemical compounds including monomers and polymers, that are obtained, in whole or in any part, from any renewable resources including but not limited to plant, animal, marine materials or forestry materials. The "biobased content" of any such compound shall be understood as the percentage of a compound's carbon content determined to have been obtained or derived from such renewable resources.

The term "furandicarboxylic acid" is used interchangeably with furandicarboxylic acid; 2,5-furandicarboxylic acid; 2,4-furandicarboxylic acid; 3,4-furandicarboxylic acid; and 2,3-furandicarboxylic acid. As used herein, the 2,5-furandicarboxylic acid (FDCA), is also known as dehydromucic acid, and is an oxidized furan derivative, as shown below:

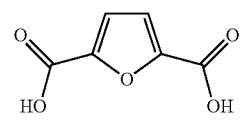

The term "furan 2,5-dicarboxylic acid (FDCA) or a functional equivalent thereof" refers to any suitable isomer of furandicarboxylic acid or derivative thereof such as, 2,5-furandicarboxylic acid; 2,4-furandicarboxylic acid; 3,4-furandicarboxylic acid; 2,3-furandicarboxylic acid or their derivatives.

The terms "PTF" and "poly(trimethylene furandicarboxylate)" are used interchangeably to refer to poly(trimethylene-2,5 furandicarboxylate), poly(trimethylene-2,4 furandicarboxylate), poly(trimethylene-2,3 furandicarboxylate), and poly(trimethylene-3,4 furandicarboxylate).

As used herein, the term "barrier" is used interchangeably with "permeation rate" or "permeability rate" or "transmission rate" to describe the gas barrier properties, with low permeation rate or low transmission rate in a material implying that the material has a high barrier.

As used herein, the term "barrier", "barrier layer" and "barrier layer", as applied to multilayer structures, refer to the ability of a structure or a layer to serve as a barrier to a fluid (e.g. a gas or a liquid).

As used herein, the improvement in gas barrier properties is calculated as the ratio of the difference in gas barrier property between transesterified-blend (t-Blend) composition and untransesterified poly(alkylene terephthalate) (PAT), for example for a transesterified blend composition (t-Blend) comprising transesterified poly(trimethylene furandicarboxylate) (t-PTF) and transesterified poly(ethylene terephthalate) (t-PET), improvement in gas barrier can be calculated as a % value, as shown below:

$$\% \text{ Improvement} = \frac{G_{t\text{-}Blend} - G_{PET}}{G_{PET}} \times 100$$

where $G_{t\text{-}Blend}$ is the measured gas (oxygen, carbon dioxide or moisture) barrier value for the transesterified-blend composition and $G_{PET}$ is the measured gas (oxygen, carbon dioxide or moisture) barrier value for untransesterified PET.

As used herein, oxygen barrier properties are measured according to ASTM D3985-05; carbon dioxide barrier properties are measured according to ASTM F2476-05; and moisture barrier properties are measured according to ASTM F1249-06.

As used herein, the terms "blockiness index" and "NMR blockiness index" are used interchangeably with the terms "degree of blockiness" and "blockiness". In a copolymer comprising a first repeat unit and a second repeat unit, the term "block" in the phrase "block copolymer" refers to a sub-section of the copolymer chain in which a plurality of first repeat units are adjacent to one another rather than adjacent to second repeat units. In a copolymer formed by completely random combination of the two repeat units, there will result a certain number of blocks, of certain lengths of each repeat unit. The specific number of blocks and their length will depend upon the molar ratios of the repeat units, the relative reactivity of the repeat units, and other factors. A block copolymer is one in which the number and size of the blocks exceeds by a statistically significant amount that determined for a random copolymer of similar overall composition.

The blockiness index, B, is defined by Devaux, op. cit., as (Devaux, J.; Godard, P.; Mercier, J. P. *J. Pol. Sci. Pol. Phys.* 1982, 20, 1875.)

$$B = F_{A_i B_j} \left( \sum_{i=1}^{2} \frac{1}{F_{A_i}} \right) (i \neq j)$$

wherein $F_{A_i B_j}$ represents the total mole fraction of the first, $A_i$ (A1 & A2) and second, $B_j$ (B1 & B2) repeat units adjacent to one another, in either order, and $F_{A_i}$ represents the mole fraction of repeat units of type "i" and the sum is taken over the two types of repeat units.

For a 50/50 mol % composition of two polymer components, B takes a value of 0.00 for a perfect block copolymer since $F_{12}=F_{21}\approx 0.00$, and a value of 1.00 for a random copolymer since $F_{12}=F_{21}\approx 0.25$, in both these cases $F_1=F_2\approx 0.50$.

Average degree of blockiness or blockiness of a transesterified-blend of two or more polymers can be determined using NMR.

Furthermore, a degree of transesterification can be considered as the progression of exchange reactions, starting from a mixture of chemically homogeneous homopolymers (e.g. A and B), with a partially transesterified-blend composition in between and concluding with a single population of copolymers. As transesterification proceeds, the concentration of the A and B homopolymer populations will decrease as the concentration of the copolymer increases. This can be observed experimentally with a chromatography technique, Interaction Polymer Chromatography (IPC). In IPC, retention time of a polymer is governed by chemical composition and microstructure of the polymer, but not by molar mass. Hence, as the degree of transesterification increases, the peak height of the homopolymers is reduced. For a fully transesterified polymer composition with a B value close to 1, only a single peak is observed at a retention time that corresponds to the average composition of the homopolymers forming the transesterified copolymer. In this way IPC, can characterization degree of transesterification and heterogeneity of the polymer components.

A transesterified-blend composition also presents characteristic thermodynamic properties. Because of the blocky structure along the polymer chain, the block copolymer retains some of the features of the separate homopolymers that constitute the blocks. For example, immiscible block copolymers have two glass transition temperatures ($T_g$) that are close to those of the separate homopolymeric components, whereas for miscible block copolymers, only a single $T_g$ is observed. For block copolymers in which the two blocks constitutes crystalline polymers, two distinct melt transitions ($T_m$) are typically observed. As blockiness decreases (that is, as B increases) it is observed that the values of $T_g$ and $T_m$ converge. As a comparison, a random copolymer exhibits only one $T_g$ and no melt transition because the randomized sequence structure disrupt the ability to crystallize.

The term "B-value" is used herein to mean the value of the blockiness index B.

As used herein, the term "first-alkylene furandicarboxylate repeat units ($R^1F$)" refers to those repeat units in a polymer chain that, were they linked together without intervening repeat units, would form a first furan-based polyester homopolymer, poly(first-alkylene furandicarboxylate). Furthermore, as used herein, the term "furan-based polyester" and "poly(first-alkylene furandicarboxylate)" includes homopolymers comprising first-alkylene furandicarboxylate repeat units ($R^1F$) and also copolymers and terpolymers, where the first-alkylene furandicarboxylate repeat units ($R^1F$) are present in major amount.

Similarly, the term "second-alkylene terephthalate repeat unit ($R^2T$)" refers to those repeat units in the polymer chain that, were they linked together without intervening repeat units, would form a second terephthalate-based polyester homopolymer, poly(second-alkylene terephthalate). Furthermore, as used herein, the term "terephthalate-based polyester" and "poly(second-alkylene terephthalate)" includes homopolymers comprising second-alkylene terephthalate repeat units ($R^2T$) and also copolymers and terpolymers, where the second-alkylene terephthalate repeat units ($R^2T$) are present in major amount. While the discussion herein is directed to combinations of two polyesters, the same considerations are directly extendible to three or more polyesters.

Composition

Disclosed herein is a transesterified-blend (t-Blend) composition comprising a transesterified furan-based polyester and a transesterified terephthalate-based polyester, wherein the B value of the composition is greater than 0.00 and less than 1.00.

The transesterified furan-based polyester comprises a first-alkylene furandicarboxylate repeat unit ($R^1F$) and one or more of a second-alkylene furandicarboxylate repeat unit ($R^2F$), a first-alkylene terephthalate repeat unit ($R^1T$), and a second-alkylene terephthalate repeat unit ($R^2T$). In another embodiment, the transesterified furan-based polyester comprises a majority of first-alkylene furandicarboxylate repeat units ($R^1F$), and a minority of one or more of a second-alkylene furandicarboxylate repeat unit ($R^2F$) a first-alkylene terephthalate repeat unit ($R^1T$), and a second-alkylene terephthalate repeat unit ($R^2T$). Furthermore, in the transesterified furan-based polyester, a plurality of the first-alkylene furandicarboxylate repeat units ($R^1F$) maybe adjacent to one another and to at least one of a second-alkylene furandicarboxylate repeat unit ($R^2F$), a first-alkylene terephthalate repeat unit ($R^1T$), or a second-alkylene terephthalate repeat unit ($R^2T$). In an embodiment, the transesterified furan-based polyester may comprise $FR^1F$ triad unit and one or more of $FR^1T$ & $TR^1F$, $TR^1T$, $FR^2F$, $FR^2T$ & $TR^2F$, $TR^2T$, $R^1FR^1$, $R^1FR^2$ & $R^2FR^1$, $R^2FR^2$, $R^1TR^1$, $R^1TR^2$ & $R^2TR^1$, and $R^2TR^2$ triad units, as shown by NMR.

The transesterified terephthalate-based polyester comprises a second-alkylene terephthalate repeat unit ($R^2T$) and one or more of a first-alkylene terephthalate repeat unit ($R^1T$), a second-alkylene furan repeat unit ($R^2F$), and a first-alkylene furandicarboxylate repeat units ($R^1F$). The transesterified terephthalate-based polyester comprises a majority of second-alkylene terephthalate repeat unit ($R^2T$), and one or more of a first-alkylene terephthalate repeat unit ($R^1T$) a second-alkylene furan repeat unit ($R^2F$), and a first-alkylene furandicarboxylate repeat units ($R^1F$). Furthermore, in the transesterified terephthalate-based polyester comprises a plurality of second-alkylene terephthalate repeat unit ($R^2T$) may be adjacent to one another and to at least one of a first-alkylene terephthalate repeat unit ($R^1T$), a second-alkylene furan repeat unit ($R^2F$), and a first-alkylene furandicarboxylate repeat units ($R^1F$). In an embodiment, the transesterified furan-based polyester may comprise $TR^2T$ triad unit and one or more of $FR^2T$ & $TR^2F$, $FR^2F$, $TR^1T$, $TR^1F$ & $FR^1T$, $FR^1F$, $R^2TR^2$, $R^1TR^2$ & $R^2TR^1$, $R^1TR^1$, $R^2FR^2$, $R^1FR^2$ & $R^2FR^1$, and $R^1FR^1$ triad units, as shown by NMR.

Figure 9:
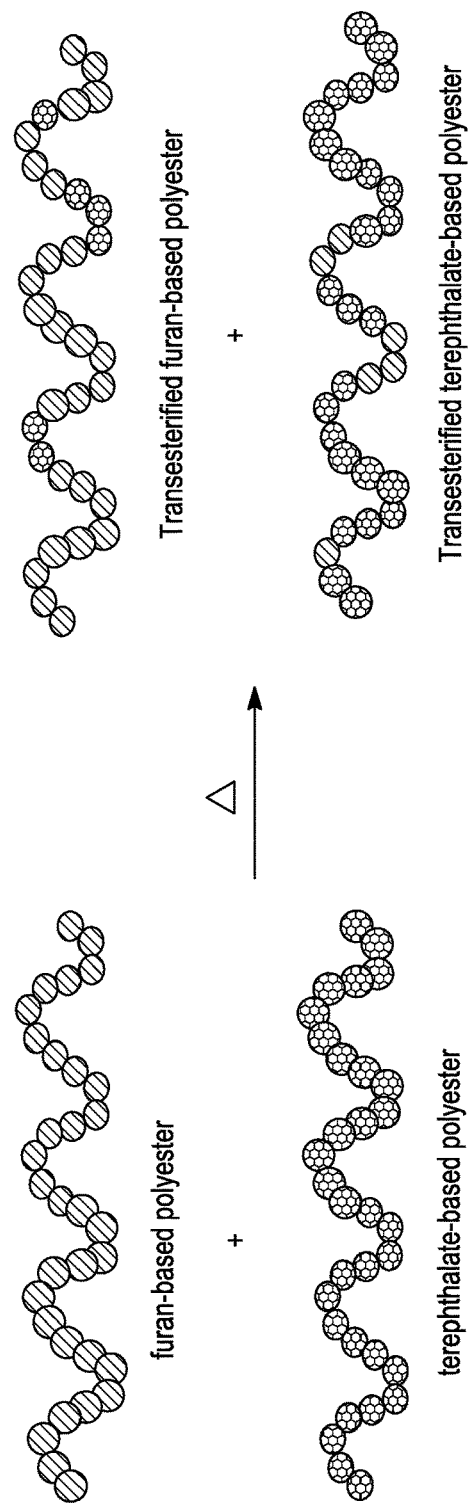
FIG. 9 shows a schematic illustration of a composition undergoing transesterification.

For example, after one transesterification event, the transesterified furan-based polyester may be schematically represented by:

-$R^1F$-$R^1F$-$R^1F$-$R^1F$-$R^1F$-$R^1F$-$R^2T$-$R^2T$-$R^2T$-, showing that $R^1F$ repeating unit may be adjacent to $R^1F$ or $R^2T$, giving triads of $R^1FR^1$, $FR^1F$, $R^1FR^2$ (equivalent to $R^2FR^1$), $FR^2T$, $R^2TR^2$, and $TR^2T$. Further transesterification can create additional adjacencies resulting in one or more of the following triads, according to their statistical probability &/or reactivity:

$R^1FR^1$, $R^1FR^2$ & $R^2FR^1$, $R^2FR^2$, $R^1TR^1$, $R^1TR^2$ & $R^2TR^1$, $R^2TR^2$, $FR^2F$, $FR^2T$ & $TR^2F$, $TR^2T$, $FR^1F$, $FR^1T$ & $TR^1F$, and $TR^1T$ FIG. 9 shows a schematic illustration of a composition undergoing transesterification.

The first-alkylene group ($R^1$) and the second-alkylene group ($R^2$) are independently selected from a $C_2$ to $C_{12}$ aliphatic group. The first-alkylene group ($R^1$) and the second-alkylene group can be same or can be different. Hence, in an embodiment, the first-alkylene furandicarboxylate repeat unit ($R^1F$) unit is chemically different from the second-alkylene furandicarboxylate repeat unit ($R^2F$). And, in another embodiment, the first-alkylene furandicarboxylate repeat unit ($R^1F$) unit is chemically same as the second-alkylene furandicarboxylate repeat unit ($R^2F=R^1F$).

In an embodiment of the composition, at least one of the transesterified furan-based polyester or the transesterified terephthalate-based polyester comprises additional ester repeat units, such as, $R^{1'}F$, $R^1X$, $R^{2'}T$, or $R^2Y$, due to the comonomers present in the untransesterified furan-based polyesters and untransesterified terephthalate-based polyester. $R^{1'}$ and $R^{2'}$ can be selected from a $C_2$ to $C_{12}$ aliphatic group and X and Y could be other diacid or polyfunctional acid besides furandicarboxylic acid and terephthalaic acid. Commonly used comonomers for the terephthalate-based polyesters include, but are not limited to isophthalic acid (IPA) and cyclohexanedimethanol (CHDM).

In one embodiment of the composition, the transesterified furan-based polyester is present in an amount in the range of 0.1-99.9 weight % or 5-90 weight % or 5-50 weight % or 5-25 weight % or 5-15 weight %, based on the total weight of the composition.

The composition as disclosed hereinabove can be characterized by a blockiness index, B, as described supra. In an embodiment, the composition can have a blockiness index of greater than 0.00 and less than 1.00, or greater than 0.00 and less than 0.50, or greater than 0.00 and less than 0.35. In another embodiment, the composition can have a blockiness index of greater than 0.40 and less than 1.00, or greater than 0.6 and less than 1.00, or greater than 0.8 and less than 1.00.

The transesterified-blend composition as disclosed hereinabove can also be characterized by interaction polymer chromatography (IPC), as described hereinbelow. The transesterified-blend composition exhibits elution behavior in IPC that differs from a solution blend of the same composition with untransesterified polyesters. The composition of the present disclosure shows a shift in one or more elution times as measured by interaction polymer chromatography, from at least one of:

a corresponding untransesterified furan-based polyester comprising the first-alkylene furandicarboxylate repeat units ($R^1F$) or a corresponding untransesterified terephthalate-based polyester comprising the second-alkylene terephthalate repeat unit ($R^2T$).

The transesterified blend composition of the present disclosure may have a blockiness index in the range of 0.00-0.60, with multi-modal or single broad peak in IPC. The composition may also have a blockiness index in the range of 0.00-0.35, with multi-modal peaks in IPC. Alternately, the composition may have a blockiness index in the range of 0.40-0.999, with single broad or narrow peak in IPC.

In an embodiment of the composition, the transesterified furan-based polyester comprises 50.1-99.9 mol % or 75-99.9 mol % or 90-99.9 mol % of first-alkylene furandicarboxylate repeat unit ($R^1F$) and 0.1-49.9 mol % or 0.1-25 mol % or 0.1-10 mol % of one or more of a second-alkylene furandicarboxylate repeat unit ($R^2F$), a first-alkylene terephthalate repeat unit ($R^1T$), and a second-alkylene terephthalate repeat unit ($R^2T$). Furthermore, the transesterified terephthalate-based polyester comprises 50.1-99.9 mol % or 75-99.9 mol % or 90-99.9 mol % of second-alkylene terephthalate repeat unit ($R^2T$); 0.1-49.9 mol % or 0.1-25 mol % or 0.1-10 mol % of a first-alkylene terephthalate repeat unit ($R^1T$) and 0.1-49.9 mol %, a second-alkylene furandicarboxylate repeat unit ($R^2F$), and a first-alkylene furandicarboxylate repeat units ($R^1F$).

Furthermore, the transesterified-blend (t-Blend) composition may also comprise an untransesterified furan-based polyester and/or an untransesterified terephthalate-based polyester. As used herein, the term "u ntransesterified furan-based polyester" refers to "poly(first-alkylene furandicarboxylate)" and includes homopolymers comprising first-alkylene furandicarboxylate repeat units ($R^1F$) and also copolymers and terpolymers, where the first-alkylene furandicarboxylate repeat units ($R^1F$) are present in major amount. As used herein, the term "untransesterified terephthalate-based polyester" refers to "poly(second-alkylene terephthalate)" and includes homopolymers comprising second-alkylene terephthalate repeat units ($R^2T$) and also copolymers and terpolymers, where the second-alkylene terephthalate repeat units ($R^2T$) are present in major amount.

The transesterified-blend composition of the present disclosure may also comprise an additional transesterified furan-based polyester and/or an additional transesterified terephthalate-based polyester. Thus, the composition may comprise two or more transesterified furan-based polyesters and/or two or more transesterified terephthalate-based polyesters.

In one embodiment, the composition of the present disclosure comprises two or more furan-based polyesters and at least one terephthalate-based polyester. Hence, such a composition may comprise a transesterified poly(first-alkylene furandicarboxylate) (t-$PR^1F$), a transesterified poly(second-alkylene terephthalate) (t-$PR^2T$) and another transesterified furan-based polyester, such as a transesterified poly(third-alkylene furandicarboxylate) (t-$PR^3F$). The transesterified poly(third-alkylene furandicarboxylate) may comprise a third-alkylene furandicarboxylate repeat unit ($R^3F$), and one or more of a first-alkylene furandicarboxylate repeat unit ($R^1F$), a second-alkylene furandicarboxylate repeat unit ($R^2F$), a third-alkylene terephthalate repeat unit ($R^3T$), and a second-alkylene terephthalate repeat unit ($R^2T$), wherein the first-alkylene group ($R^1$), the second-alkylene group ($R^2$), and the third-alkylene group ($R^3$) are independently selected from a $C_2$ to $C_{12}$ aliphatic group. In an embodiment, the transesterified poly(third-alkylene furandicarboxylate) may comprise 33.5-99.9 mol % or 50.1-99.9 mol % or 75-99.9 mol % or 90-99.9 mol % of a third-alkylene furandicarboxylate repeat units ($R^3F$), and 0.1-33.4 mol % or 0.1-25 mol % or 0.1-10 mol % of one or more of a first-alkylene furandicarboxylate repeat unit ($R^1F$), a second-alkylene furandicarboxylate repeat unit ($R^2F$), a third-alkylene terephthalate repeat unit ($R^3T$), and a second-alkylene terephthalate repeat unit ($R^2T$).

In another embodiment, the composition of the present disclosure comprises at least one furan-based polyester and two or more terephthalate-based polyesters. Such a composition may comprise a transesterified poly(first-alkylene furandicarboxylate) (t-$PR^1F$), a transesterified poly(second-alkylene terephthalate) (t-$PR^2T$) and another transesterified terephthalate-based polyester, such as transesterified poly(fourth-alkylene terephthalate) (t-$PR^4T$). The transesterified poly(fourth-alkylene terephthalate) may comprise a fourth-alkylene terephthalate repeat unit ($R^4T$) and one or more of a first-alkylene terephthalate repeat unit ($R^1T$), second-alkylene terephthalate repeat unit ($R^2T$), a fourth-alkylene furandicarboxylate repeat unit ($R^4F$), and a first-alkylene furandicarboxylate repeat unit ($R^1F$), wherein the first-alkylene group ($R^1$), the second-alkylene group ($R^2$), and the fourth-alkylene group ($R^4$) are independently selected from a $C_2$ to $C_{12}$ aliphatic group. In an embodiment, the transesterified poly(fourth-alkylene terephthalate) may comprise 33.5-99.9 mol % or 50.1-99.9 mol % or 75-99.9 mol % or 90-99.9 mol % of a fourth-alkylene terephthalate repeat unit ($R^4T$), and 0.1-33.4 mol % or 0.1-25 mol % or 0.1-10 mol % of at least one of first-alkylene terephthalate repeat unit ($R^1T$), second-alkylene terephthalate repeat unit ($R^2T$), a fourth-alkylene furandicarboxylate repeat unit ($R^4F$), and a first-alkylene furandicarboxylate repeat unit ($R^1F$).

In an embodiment of the composition, $R^1$ is a trimethylene group, such that:
  i. the first-alkylene furandicarboxylate repeat unit ($R^1F$) is trimethylene furandicarboxylate repeat unit (3F),
  ii. the first-alkylene terephthalate repeat unit ($R^1T$) is trimethylene terephthalate repeat unit (3T),
  iii. the transesterified furan-based polyester is transesterified poly(trimethylene furandicarboxylate) (t-PTF), and
  iv. the transesterified terephthalate-based polyester is transesterified poly(second-alkylene terephthalate) (t-$PR^2T$), wherein the second-alkylene group ($R^2$) is selected from a $C_2$ to $C_{12}$ aliphatic group.

In one embodiment of the composition, $R^2$ is an ethylene group, such that
  viii. the second-alkylene furandicarboxylate repeat units ($R^2F$) is ethylene furandicarboxylate repeat units (2F),
  ix. the second-alkylene terephthalate repeat unit ($R^2T$) is ethylene terephthalate repeat unit (2T),
  x. the transesterified terephthalate-based polyester is transesterified poly(ethylene terephthalate) (t-PET), and
  xi. the transesterified furan-based polyester is transesterified poly(first-alkylene furandicarboxylate) (t-$PR^1F$), wherein the first-alkylene group ($R^1$) is selected from a $C_2$ to $C_{12}$ aliphatic group.

In another embodiment, there is provided a composition, wherein $R^1$=trimethylene group and $R^2$=ethylene group, the composition comprising:
  a. a transesterified poly(trimethylene furandicarboxylate) (t-PTF) comprising a trimethylene furandicarboxylate repeat unit (3F) and one or more of an ethylene furandicarboxylate repeat unit (2F) and a trimethylene terephthalate repeat unit (3T) and an ethylene terephthalate repeat unit (2T);
  b. a transesterified poly(ethylene terephthalate) (t-PET) comprising an ethylene terephthalate repeat unit (2T) and one or more of a trimethylene terephthalate repeat unit (3T), an ethylene furandicarboxylate repeat unit (2F), and a trimethylene furandicarboxylate repeat unit (3T); and c. optionally one or more of poly(trimethylene furandicarboxylate) (PTF) and poly(ethylene terephthalate) (PET).

The NMR spectrum of such a composition may show peaks due to one or more of F3F, F3T, T3T, F2F, F2T, T2T, 3F3, 3F2, 2F2, 3T3, 3T2, and 2T2, where 3 represents trimethylene group, 2 represents ethylene group, F represents furandicarboxylate group, and T represents terephthalate group.

Figure 10:
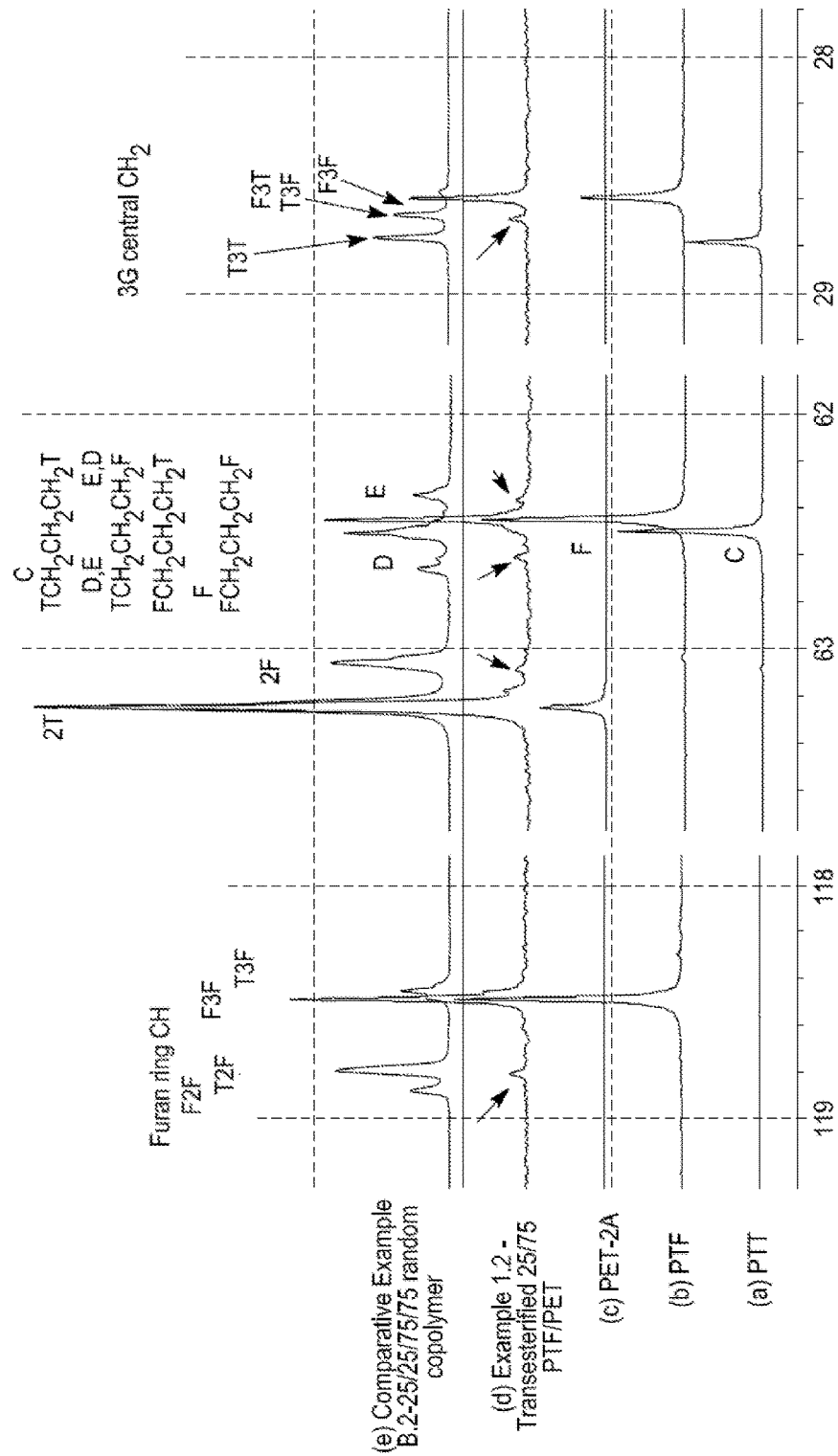
FIG. 10 shows exemplary C13 NMR spectra of (a) poly(trimethylene terephthalate) (PTT); (b) poly(trimethylene furandicarboxylate) (PTF); (c) poly(ethylene terephthalate) with IPA (PET-2A); (d) Example 1.2—a transesterified blend composition of PTF and PET-IPA, 25/75 PTF/PET; (e) Comparative Example B.2—a random copolymer of FDCA/PDO/TPA/EG 25/25/75/75 composition.

FIG. 10 shows an exemplary C13 NMR spectra of a transesterified blend composition of PTF and PET-IPA present in a weight ratio of 25:75::PTF/PET, having a B value of 0.11 or 0.053 depending on NMR method used. Also shown for comparison is an NMR spectra of a random copolymer having a composition of FDCA/PDO/TPA/EG::25/25/75/75, which will have a B value of 1. Comparing the NMR spectra of the transesterified blend composition of PTF and PET with a random copolymer, poly(trimethylene terephthalate) (PTT); poly(trimethylene furandicarboxylate) (PTF) and poly(ethylene terephthalate) with IPA (PET-2A), one can clearly see the differences in the composition of the transesterified blend composition with that of random copolymer.

In another embodiment, there is provided a composition, wherein both $R^1$ and $R^2$ are ethylene groups, the composition comprising:

a. a transesterified poly(ethylene furandicarboxylate) (t-PEF) comprising a majority of ethylene furandicarboxylate repeat units (2F) and at least one ethylene terephthalate repeat unit (2T);

b. a transesterified poly(trimethylene terephthalate) (t-PET) comprising a majority of ethylene terephthalate repeat unit (2T) and at least one ethylene furandicarboxylate repeat unit (2F), and c. optionally one or more of poly(ethylene furandicarboxylate) (PEF) and poly(ethylene terephthalate) (PET).

In another embodiment, there is provided a composition, wherein both $R^1$ and $R^2$ are trimethylene groups, the composition comprising:

a. a transesterified poly(trimethylene furandicarboxylate) (t-PTF) comprising a majority of trimethylene furandicarboxylate repeat units (3F) and at least one trimethylene terephthalate repeat unit (3T); and b. a transesterified poly(trimethylene terephthalate) (t-PTT) comprising a majority of ethylene terephthalate repeat unit (3T) and at least one trimethylene furandicarboxylate repeat unit (3F); and c. optionally one or more of poly(trimethylene furandicarboxylate) (PTF) and poly(trimethylene terephthalate) (PTT).

In an embodiment, the composition may also comprise an effective amount of a transesterification inhibitor or a transesterification catalyst. The term "effective amount" of a transesterification inhibitor or a transesterification catalyst means that there is a sufficient amount of either a transesterification inhibitor or a transesterification catalyst for the concentration thereof to be employed to limit or control the degree of transesterification. Any suitable transesterification inhibitor may be used including, but not limited to organo phosphorous compounds such as triphenyl phosphite, triphenyl phosphate, dioctadecyl phosphate, diphenyl phosphate, dibenzyl phosphate, decyldiphenyl phosphate, phosphoric acid, phosphate ester, sodium dihydrogen phosphate, hydrogen phosphates of zinc or calcium, and silica. The transesterification inhibitor may be present in an amount in the range of 0.001-20 wt % or 0.001-10 wt % or 0.001-5 wt %, based on total weight of the composition.

Any suitable transesterification catalyst may be used including, but not limited to titanium alkoxide, organotitanates, organozirconates, residual catalysts based on titanium, antimony, cobalt and manganese. The transesterification catalyst may be present in an amount in the range of 0.0001-1.00 wt % or 0.001-0.5 wt % or 0.001-0.05 wt %, based on total weight of the composition.

The compositions disclosed herein relate to a transesterified-blend composition formed by controlled and limited transesterification of two different polyesters, a furan-based polyester and a terephthalate-based polyester, optionally in the presence of a transesterification inhibitor or a transesterification catalyst.

The transesterified-blend (t-Blend) compositions of the present disclosure may further comprise additives commonly employed in the art such as process aids and property modifiers, such as, for example, antioxidants, plasticizers, UV light absorbers, antistatic agents, flame retardants, lubricants, colorants, fillers and heat stabilizers.

Barrier Properties of the Transesterified-Blend (t-Blend) Composition

Figure 7:
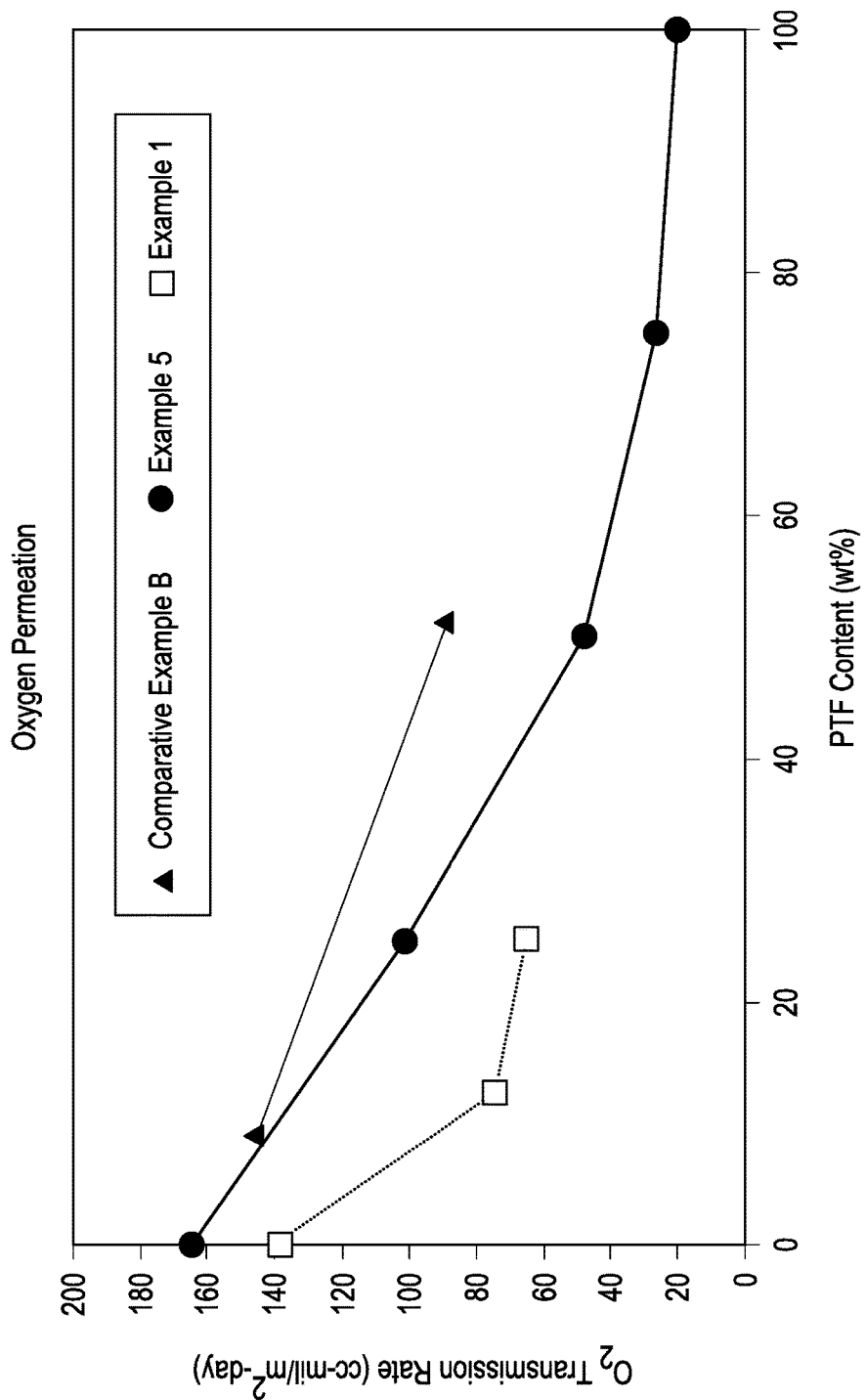
FIG. 7 shows the oxygen transmission rate of (a) triangles—a random copolymer of FDCA/PDO/TPA/EG composition; (b) circles—a transesterified blend composition of PTF and PET-CHDM; and (c) squares—a transesterified blend composition of PTF and PET-IPA as a function of PTF content of the composition.

The transesterified-blend composition of the present disclosure provides a substantial gas barrier to at least one of oxygen, carbon dioxide or moisture. Furthermore, the transesterified-blend compositions provide improvement in gas barrier as compared to untransesterified terephthalate-based polyester. Furthermore, the improvement in gas barrier due to the transesterified-blend composition is exponential as a function of the amount of transesterified furan-based polyester. In comparison, a random copolymer having the same repeating units as the transesterified furan-based polyester will show an improvement in oxygen gas barrier that is linearly dependent on the content of furan-based polyester. FIG. 7 shows oxygen transmission rate as a function of PTF content in the composition. As can be seen in FIG. 7, the oxygen transmission rate of transesterified blend compositions of PTF and PET-CHDM (circles; B value in the range of 0.011 to 0.056) and that of PTF and PET-IPA (squares; B value in the range of 0.034 to 0.13) is lower than that of a random copolymer of FDCA/PDO/TPA/EG (triangles).

The % improvement provided by the transesterified-blend composition as disclosed herein above for oxygen is in the range of 2-99% or 10-98% or 25-96%. The % improvement provided by the transesterified-blend composition, as disclosed herein above for carbon dioxide is in the range of 2-99% or 10-98% or 25-96%.

The improvement in barrier to oxygen provided by the transesterified-blend composition in comparison to a non-transesterified blend having similar PTF composition is at least 5% or at least 10% at least 25% or at least 35%. The improvement in barrier to carbon dioxide provided by the transesterified-blend composition in comparison to a non-transesterified blend having similar PTF composition is at least 5% or at least 10%.

In an embodiment, there is a method of improving gas barrier properties of a composition comprising a terephthalate-based polyester, comprising the step of melt blending 0.1-99.9% by weight of a poly(first-alkylene furandicarboxylate) ($PR^1F$) with 0.1-99.9% by weight of a poly(second-alkylene terephthalate) ($PR^2T$) at a melt blending temperature and a melt blending time to form a transesterified blend composition. As used herein, the melt blending time is the minimum time required for the transesterified blend composition to have a desired degree of transesterification, and the melt blending temperature is in the range of extrusion processing temperatures of the poly(first-alkylene furandicarboxylate) and the poly(second-alkylene terephthalate). The desired degree of transesterification can be determined by at least one of:

an NMR blockiness index of greater than 0.00 and less than 1.00, or a shift in one or more IPC elution times from at least one of the poly(first-alkylene furandicarboxylate) or poly(second-alkylene terephthalate), and In an embodiment, where the poly(first-alkylene furandicarboxylate) is characterized by a first melting temperature ($T_{m,1}$) and the poly(second-alkylene terephthalate) is characterized by a second melting temperature ($T_{m,2}$), then the melt blending temperature is higher than the higher of the first and the second melting temperature.

In an embodiment, each of the poly(first-alkylene furandicarboxylate) and the poly(second-alkylene terephthalate) may be subjected to a temperature above its melting point, thereby converting the polyesters into a first polyester melt and a second polyester melt and then melt blending the first polyester melt and the second polyester melt at a temperature and a duration to form a transesterified-blend composition as disclosed hereinabove.

In another embodiment, each of the poly(first-alkylene furandicarboxylate) and the poly(second-alkylene terephthalate) are first mixed in solid form, such as pellets to form a mixture and then the mixture is subjected to a melt blending temperature, thereby converting the mixture into one melt blend composition for a duration of time to form a transesterified-blend composition as disclosed hereinabove.

In an embodiment, the process may also comprise adding an effective amount of a transesterification inhibitor or a transesterification catalyst to the reaction mixture comprising the poly(first-alkylene furandicarboxylate) and the poly(second-alkylene terephthalate) to control the degree of transesterification and hence the blockiness index.

The degree of transesterification and hence the blockiness index of the transesterified blend composition can be controlled by varying one or more of melt-blending time, melt blending temperature, end group chemistry of the poly(first-alkylene furandicarboxylate) and the poly(second-alkylene terephthalate) and also compatability of the two polyesters such as by changing the comonomer chemistry and comonomer content present in the poly(first-alkylene furandicarboxylate) and/or the poly(second-alkylene terephthalate). For example, as shown below in the examples it was found that the transesterification blend of poly(ethylene terephthalate) (PET) with poly(trimethylene furandicarboxylate) had higher blockiness index when PET had isophthalic acid (IPA) as a comonomer due to higher transesterification rate as compared to when PET when cyclohexane dimethanol (CHDM) was the comonomer.

Furthermore, the degree or the amount of transesterification can be monitored using by interaction polymer chromatography (IPC), wherein the transesterified blend composition shows a shift in one or more elution times as measured by IPC, from at least one of the poly(first-alkylene furandicarboxylate) or poly(second-alkylene terephthalate).

The reaction mixture can comprise additional third, fourth, or more polyesters. However, each additional polyester contributes additional repeat units to the transesterified furan-based polyester and the transesterified terephalate-based polyester, that can affect the desired crystallinity and other properties, such as mechanical and thermal, and barrier properties. Other esters suitable for inclusion as third or more ester repeat units in the transesterified furan-based polyester and the transesterified terephalate-based polyester of the present composition, include but are not limited to aromatic ester repeat units such as alkylene naphthalate; alkylene isophalate, and $C_2$-$C_{10}$ aliphatic ester repeat units optionally substituted by one or more ether groups.

The composition and the reaction mixture, as disclosed hereinabove can include, as desired, such additives as process aids and property modifiers, such as plasticizers, fillers, flame retardants, UV absorbents, colorants; dyes; nanoparticles; nucleating agents; anti-stats and any other known to add value to polymer so long as they do not materially interfere with the transesterification process.

In another aspect, there is provided a process for making a transesterified-blend composition comprising the steps of:

a) forming a reaction mixture comprising
  i. a first furan-based polyester characterized by a first melting temperature, and
  ii. a second terephalate-based polyester characterized by a second melting temperature different from the first melting temperature;

b) subjecting each polyester in the reaction mixture to a temperature above its melting point, thereby converting the polyesters into a first polyester melt and a second polyester melt; and c) melt blending the first polyester melt and the second polyester melt at a temperature and a duration to form a transesterified-blend composition as disclosed hereinabove, wherein the temperature is higher than the higher of the first and second melting temperatures for a time duration.

In an embodiment of the process, the first furan-based polyester is present in an amount in the range of 0.1-99.9 weight % or 5-90 weight % or 5-50 weight % or 5-25 weight % or 5-15 weight %, based on the total weight of the reaction mixture.

In an embodiment, the first furan-based polyester is poly(alkylene furandicarboxylate) comprising repeating units derived from a $C_2$-$C_{12}$ aliphatic diol and 2,5-furan dicarboxylic acid or a derivative thereof. Examples of suitable $C_2$-$C_{12}$ aliphatic diol include, but are not limited to, ethylene glycol, diethylene glycol, 1,2-propanediol, 1,3-propanediol, 1,4-butanediol, 1,5-pentanediol, 1,6-hexanediol, 1,4-cyclohexanedimethanol, and 2,2-dimethyl-1,3-propanediol.

In an embodiment, the aliphatic diol is a biologically derived $C_3$ diol, such as 1,3 propane diol.

In a derivative of 2,5-furan dicarboxylic acid, the hydrogens at the 3 and/or 4 position on the furan ring can, if desired, be replaced, independently of each other, with —$CH_3$, —$C_2H_5$, or a $C_3$ to $C_{25}$ straight-chain, branched or cyclic alkane group, optionally containing one to three heteroatoms selected from the group consisting of O, N, Si and S, and also optionally substituted with at least one member selected from the group consisting of —Cl, —Br, —F, —I, —OH, —$NH_2$ and —SH. A derivative of 2,5-furan dicarboxylic acid can also be prepared by substitution of an ester or halide at the location of one or both of the acid moieties.

In an embodiment, the first furan-based polyester is a copolymer (random or block) derived from furan dicarboxylic acid, at least one of a diol or a polyol monomer, and at least one of a polyfunctional aromatic acid or a hydroxyl acid. The molar ratio of furan dicarboxylic acid to other acids can be any range, for example the molar ratio of either component can be greater than 1:100 or alternatively in the range of 1:100 to 100 to 1 or 1:9 to 9:1 or 1:3 to 3:1 or 1:1 in which the diol is added at an excess of 1.2 to 3 equivalents to total acids charged.

Examples of other diol and polyol monomers that can be included, in addition to those named above, in the polymerization monomer makeup from which a copolymer can be made include cyclohexane dimethanol, diethylene glycol, 1,4-benzenedimethanol, poly(ethylene glycol), poly(tetrahydrofuran), 2,5-di(hydroxymethyl)tetrahydrofuran, isosorbide, isomannide, glycerol, pentaerythritol, sorbitol, mannitol, erythritol, and threitol.

Examples of suitable polyfunctional acids include but are not limited to terephthalic acid, isophthalic acid, adipic acid, azelic acid, sebacic acid, dodecanoic acid, 1,4-cyclohexane dicarboxylic acid, maleic acid, succinic acid, 1,3,5-benzenetricarboxylic acid, and 2,6 naphthalene dicarboxylix acid.

Examples of suitable hydroxy acids include but are not limited to, glycolic acid, hydroxybutyric acid, hydroxycaproic acid, hydroxyvaleric acid, 7-hydroxyheptanoic acid, 8-hydroxycaproic acid, 9-hydroxynonanoic acid, or lactic acid; or those derived from pivalolactone, ε-caprolactone or L,L, D,D or D,L lactides.

Exemplary copolymers derived from furan dicarboxylic acid, at least one of a diol or a polyol monomer, and at least one of a polyfunctional acid or a hydroxyl acid include, but are not limited to, copolymer of 1,3-propanediol, 2,5-furandicarboxylic acid and terephthalic acid; copolymer of 1,3-propanediol, 2,5-furandicarboxylic acid and succinic acid; copolymer of 1,3-propanediol, 2,5-furandicarboxylic acid; copolymer of 1,3-propanediol, 2,5-furandicarboxylic acid and adipic acid; copolymer of 1,3-propanediol, 2,5-furandicarboxylic acid and sebacic acid, copolymer of 1,3-propanediol, 2,5-furandicarboxylic acid and isosorbide; copolymer of 1,3-propanediol, 2,5-furandicarboxylic acid and isomannide.

In an embodiment, the second terephthalate-based polyester is poly(alkylene furandicarboxylate) comprising units derived from a $C_2$-$C_{12}$ aliphatic diol and a terephthalic acid and/or derivatives thereof, as disclosed hereinabove. In an embodiment, the second terephthalate-based polyester is a copolymer (random or block) derived from terephthalic acid, at least one of a diol or a polyol monomer, and at least one of a polyfunctional aromatic acid or a hydroxyl acid.

In one embodiment of the process, the first furan-based polyester is PTF. In an alternative embodiment of the process, the second terephthalate-based polyester is PET. In another embodiment of the process, the first furan-based polyester is PTT and the second terephthalate-based polyester is PET.

In one embodiment of the process, the reaction mixture consists essentially of PTF and PET. Inclusion of additional polyesters in the reaction mixture can affect the desired crystallinity and other properties, such as mechanical and thermal, and barrier properties.

In a further embodiment of the process, the reaction mixture comprises 0.1 to 50 weight % of PTF, and 99.9 to 50 weight % of PET.

In a further embodiment of the process, the reaction mixture comprises 10 to 30 weight % of PTF, and 90 to 70 weight % of PET.

In a further embodiment of the process, the first furan-based polyester is PTF, the second terephthalate-based polyester is PET, and the melt blending of the first and second polyesters is performed at a temperature in the range of 200 to 300° C. or 250 to 280° C.

Articles and Multi-Layer Structures

The transesterified-blend compositions of the present disclosure are suitable for manufacturing:
  mono- and bi-oriented films, and films multilayered with other polymers;
  mono-, multi-layer blown articles (for example bottles)
  mono-, multi-layer injection molded articles
  cling or shrink films for use with foodstuffs;
  thermoformed foodstuff packaging or containers, both mono- and multi-layered, as in containers for milk, yogurt, meats, beverages and the like;
  coatings obtained using the extrusion coating or powder coating method on substrates comprising of metals not limited to such as stainless steel, carbon steel, aluminum, such coatings may include binders, agents to control flow such as silica, alumina
  multilayer laminates with rigid or flexible backings such as for example paper, plastic, aluminum, or metallic films;
  formed or formable beads for the production of pieces obtained by sintering;
  formed and semi-formed products, including formed blocks formed using pre-expanded articles;
  formed sheets, thermoformed form sheets, and containers obtained from them for use in foodstuff packaging; and formed bottles.

FIG. 1 schematically illustrates a cross-sectional view of a portion of an exemplary article 100 comprising a barrier layer 110, in accordance with various embodiments of the present invention. The barrier layer 110 comprises a first surface 103 and a second surface 104, the second surface 104 in contact with an outside environment. As shown in FIG. 1, the barrier layer 110 is a single layer film or a sheet. The barrier layer 110 comprises a transesterified-blend composition 102, as disclosed hereinabove. The transesterified-blend composition 102 comprising a transesterified furan-based polyester and a transesterified terephthalate-based polyester. In an embodiment, the transesterified furan-based polyester is PTF and the transesterified terephthalate-based polyester is PET.

Figure 2:
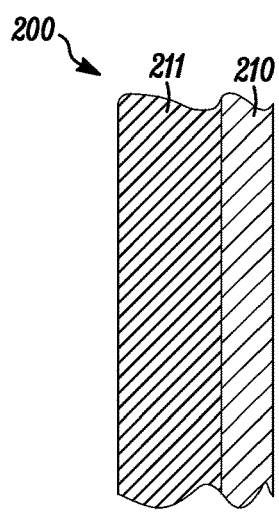
FIG. 2 schematically illustrates a cross-sectional view of a portion of an exemplary multilayer structure comprising two layers, in accordance with the present invention.

FIG. 2 schematically illustrates a cross-sectional view of a portion of an article 200 comprising at least two layers, in accordance with an embodiment of the present invention. The article 200, as shown in FIG. 2 comprises a barrier layer 210 disposed on a first structural layer 211, wherein at least one of the barrier layer 210 or the first structural layer 211 comprises the transesterified blend composition as disclosed hereinabove comprising a transesterified furan-based polyester and a transesterified terephthalate-based polyester.

Figure 3:
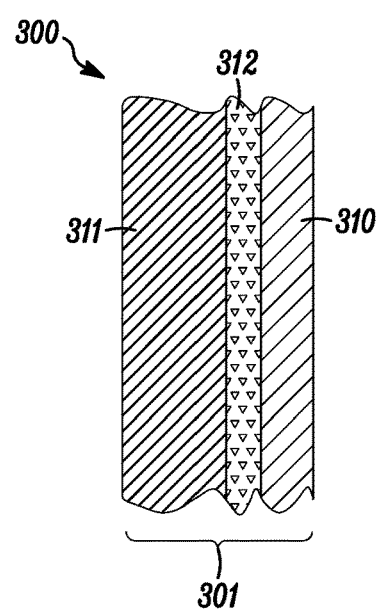
FIG. 3 schematically illustrates a cross-sectional view of a portion of an exemplary multilayer structure comprising at least three layers, in accordance with the present invention.

FIG. 3 schematically illustrates a cross-sectional view of a portion of an exemplary article 300 comprising a multi-layer structure 301 comprising at least three layers, in accordance with an embodiment of the present invention. The multilayer structure 301, as shown in FIG. 3 comprises a barrier layer 310, a first structural layer 311, and a first tie layer 312 interposed between the barrier layer 310 and the first structural layer 311, wherein at least one of the barrier layer 310 or the first structural layer 311 comprises the composition as disclosed hereinabove comprising a transesterified furan-based polyester and a transesterified terephthalate-based polyester.

Figure 4:
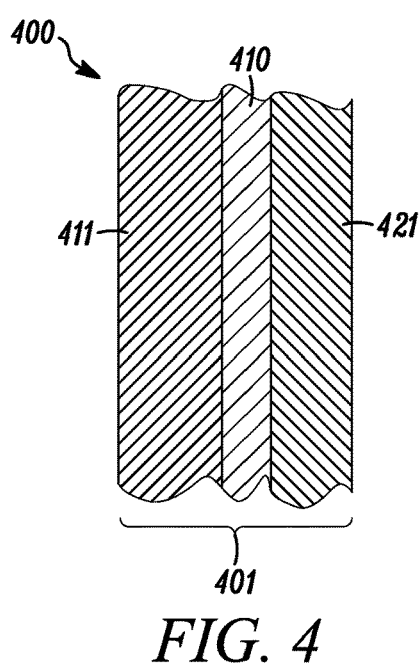
FIG. 4 schematically illustrates a cross-sectional view of a portion of an exemplary multilayer structure comprising at least three layers in accordance with the present invention.

FIG. 4 schematically illustrates a cross-sectional view of a portion of an exemplary article 400 comprising a multi-layer structure 401 comprising at least three layers, in accordance with an embodiment of the present invention. The multilayer structure 401, as shown in FIG. 4 comprises a barrier layer 410, a first structural layer 411 and a second structural layer 421, such that the barrier layer 410 is interposed between the first layer 411 and the second structural layer 421, and wherein at least one of the barrier layer 410, the first structural layer 211 or the second structural layer 421 comprises the composition as disclosed hereinabove comprising a transesterified furan-based polyester and a transesterified terephthalate-based polyester. In an embodiment, the multilayer structure 401 further comprises a first tie layer (not shown) disposed between the barrier layer 410 and the first structural layer 411 and a second tie layer (not shown) disposed between the barrier layer 410 and a second structural layer 421, such that the barrier layer 410 is interposed between the first tie layer and the second tie layer.

The multilayer structure of the present invention may comprise other possible layer configurations not illustrated, including, but not limited to six layers, seven layers, eight layers, etc., wherein at least one layer is a barrier layer, the barrier layer comprising the transesterified-blend composition, as disclosed herein above.

Any suitable material can be used for the first structural layer 211, 311, 411 and the second structural layer 421. Exemplary materials for the first layer 211, 311, 411 and the second layer 421 include, but are not limited to transesterified blend compositions of the present disclosure, aramids; polyethylene sulfide (PES); polyphenylene sulfide (PPS); polyimide (PI); polyamide such as Nylon; polyethylene imine (PEI); polyethylene naphthalate (PEN); polysulfone (PS); polyether ether ketone (PEEK); polyolefins such as HDPE, LDPE, PE, PP; poly(cyclic olefins); and poly(cyclohexylene dimethylene terephthalate), EvOH, poly(alkylene furandicarboxylate) such as PEF, PTF, PBF and poly(alkylene terephthalate), such as polyethylene terephthalate (PET), polytrimethylene terephthalate (PTT), and polybutylene terephthalate (PBT).

In an embodiment, the tie layer 312, as shown in FIG. 3 comprises one or more olefin copolymers. The one or more olefin copolymers include, but are not limited to, propylene copolymers, ethylene copolymers and mixtures thereof.

"Propylene copolymer" refers to a polymer comprising repeat units derived from propylene and at least one additional monomer. Suitable propylene based copolymers include, but are not limited to, copolymers of propylene with another α-olefin as a monomer, including but not limited to ethylene, 1-butene, 1-pentene, 3-methyl-1-butene, 1-hexene or 4-methyl-1-pentene. Other comonomers include but not limited to maleic anhydride, acrylic acid, acrylates and methacrylates. Copolymers could be either random or block copolymers.

"Ethylene copolymer" refers to a polymer comprising repeat units derived from ethylene and at least one additional monomer.

The one or more ethylene copolymers comprised in the tie layer of the multilayer structure may be chosen among ethylene α-olefin, ethylene vinyl acetate copolymers, ethylene maleic anhydride copolymers, ethylene acrylic acid (or the neutralized salt form of the acid) copolymers, ethylene methacrylic acid (or the neutralized salt form of the acid) copolymers, ethylene glycidyl (meth)acrylate copolymers, ethylene alkyl (meth)acrylate copolymers, or combinations of two or more thereof. "Alkyl (meth)acrylate" refers to alkyl acrylate and/or alkyl methacrylate. Ethylene alkyl (meth)acrylate copolymers are thermoplastic ethylene copolymers derived from the copolymerization of ethylene comonomer and at least one alkyl (meth)acrylate comonomer, wherein the alkyl group contains from one to ten carbon atoms and preferably from one to four carbon atoms. More preferably, the ethylene copolymer comprised in the tie layer are chosen among ethylene α-olefin, ethylene vinyl acetate copolymers, ethylene methyl (meth)acrylate copolymers, ethylene ethyl (meth)acrylate copolymers, ethylene butyl (meth)acrylate copolymers, or combinations of two or more thereof.

When the ethylene copolymer used in the tie layer is an ethylene α-olefin copolymer, it comprises ethylene and an α-olefin of three to twenty carbon atoms. Preferred α-olefin include four to eight carbon atoms.

The one or more olefin homopolymers and/or copolymers can be modified copolymer, meaning that the copolymer is grafted and/or copolymerized with organic functionalities. Modified polymers for use in the tie layer may be modified with acid, anhydride and/or epoxide functionalities. Examples of the acids and anhydrides used to modify polymers, which may be mono-, di- or polycarboxylic acids are acrylic acid, methacrylic acid, maleic acid, maleic acid monoethylester, fumaric acid, furnaric acid, itaconic acid, crotonic acid, 2,6-naphthalene dicarboxylic acid, itaconic anhydride, maleic anhydride and substituted maleic anhydride, e.g. dimethyl maleic anhydride or citrotonic anhydride, nadic anhydride, nadic methyl anhydride, and tetrahydrophthalic anhydride, or combinations of two or more thereof, maleic anhydride being preferred.

Examples of epoxides used to modify polymers are unsaturated epoxides comprising from four to eleven carbon atoms, such as glycidyl (meth)acrylate, allyl glycidyl ether, vinyl glycidyl ether and glycidyl itaconate, glycidyl (meth)acrylates being particularly preferred. Epoxide-modified ethylene copolymers preferably contain from 0.05 to 15 wt % of an epoxide, the weight percentage being based on the total weight of the modified ethylene copolymer. Preferably, epoxides used to modify ethylene copolymers are glycidyl (meth)acrylates. The ethylene/glycidyl (meth)acrylate copolymer may further contain copolymerized units of an alkyl (meth)acrylate having from one to six carbon atoms and an .alpha.-olefin having 1-8 carbon atoms. Representative alkyl (meth)acrylates include methyl (meth)acrylate, ethyl (meth)acrylate, propyl (meth)acrylate, butyl (meth)acrylate, isobutyl (meth)acrylate, hexyl (meth)acrylate, or combinations of two or more thereof. Of note are ethyl acrylate and butyl acrylate. The α-olefin can be selected from the group of propylene, octene, butene and hexane, especially propylene.

Preferably, modified ethylene copolymers comprised in the tie layer are modified with acid, anhydride and/or glycidyl (meth)acrylate functionalities.

Exemplary ethylene based copolymers include, but are not limited to, polyethylene-co vinylacetate, polyethylene-co-methylacrylate, polyethylene-co-maleic anhydride, polyethylene-co-acrylate (i.e. methylacrylate, ethylacrylate, butylacrylate etc), polyethylene-co-glycidylacrylate, polyethylene-co-glycidylmethacrylate, polyethylene-co-vinylalcohol, polyethylene-co-acrylic acid; polyethylene-co-acrylic acid sodium salt, polyethylene-co-methylmethacrylate, polyethylene-co-methacrylic acid, and polyethylene-co-methacrylic acid sodium salt.

Copolymers and modified polymers useful for the present invention are commercially available for example under the trademarks Elvax®, Elvaloy™AC, Bynel® from E. I. du Pont de Nemours and Company, Wilmington, Del. (DuPont).

The tie layers could also be used to improve the adhesion between layers comprising polar materials, for example polyesters and polyamides. Examples of such tie layers include but are not limited to, polyacrylates, aromatic polyesters, aliphatic polyesters, aliphatic-aromatic copolyesters, polyamides, polyesteramides, polyvinyl alcohol, aliphatic polycarbonates, aromatic polycarbonates, polymaleic anhydride or grafted polymaleic anhydride, polyvinylacetate, polyvinylacetate-co-maleic anhydride, polyvinylalcohol-co-vinylacetate, polyacrylate-co-vinylacetate, polyacrylate-covinylalcohol, polyacrylate-co-maleic anhydride, polyvinylalcohol-co-maleic anhydride, polyacrylic acid or the neutralized salt form of the acid, polyacrylic acid-co-vinyl alcohol, polyacrylic acid-co-vinyl acetate, polyacrylic acid-co-maleic anhydride, or blends of two or more components.

The barrier layer has a thickness in the range of 0.5-50% or 1-25% or 1-10% or 1-5% of the total thickness of the multilayer structure to provide a permeation barrier to a chemical.

In an embodiment, the article 100, 200, 300, 400 can be a film, a sheet, a coating, a shaped or molded article, or a layer in a multi-layer laminate, for example a shrink-wrap film. A film herein can be oriented or not oriented, or uniaxially oriented or biaxially oriented.

The difference between a sheet and a film is the thickness, but, as the thickness of an article will vary according to the needs of its application, it is difficult to set a standard thickness that differentiates a film from a sheet. Nevertheless, a sheet will be defined herein as having a thickness greater than about 0.25 mm (10 mils). Preferably, the thickness of the sheets herein are from about 0.25 mm to about 25 mm, more preferably from about 2 mm to about 15 mm, and even more preferably from about 3 mm to about 10 mm. In a preferred embodiment, the sheets hereof have a thickness sufficient to cause the sheet to be rigid, which generally occurs at about 0.50 mm and greater. However, sheets thicker than 25 mm, and thinner than 0.25 mm may be formed. Correspondingly, films as formed from the polymers hereof will in almost all cases have a thickness that is less than about 0.25 mm.

In another embodiment, the article can be a shaped or molded article, such as one or more of a container, a container and a lid, or a container and a closure, for example a container such as a beverage container. In another embodiment, the article is a beverage container.

In another embodiment, the article can be a thermoformed foodstuff mono- or multi-layered packaging container for milk, yogurt, meats, beverages and the like.

In an embodiment, the multilayer structure, as disclosed herein above is in a form of a housing provided with a port for introducing a fluid in an enclosure defined by the housing, wherein the multilayer structure provides permeation barrier to the chemical.

In an embodiment, the housing is in a form of a hose, a pipe, a duct, a tube, a tubing or a conduit.

In an embodiment, the housing is in a form of a container, a container and a lid, or a container and a closure.

In an embodiment, the fluid is a hydrocarbon fuel and the multilayer structure is in a form of a fuel line or a fuel container.

In an embodiment, the fluid is a hydrocarbon fuel. Suitable hydrocarbon fuels include, but are not limited to, ethanol, methanol, butanol, toluene, isooctane, gasoline, kerosene, liquefied petroleum, diesel and biodiesel.

In another embodiment, the fluid is an organic liquid. Suitable organic liquids include, but are not limited to, acetone, acetonitrile, dichloromethane, 1,3-butadiene, carbon disulfide, dichloromethane, diethylamine, dimethylformamide, ethyl acetate, ethylene oxide, n-hexane, methanol, methyl chloride, nitrobenzene, tetrachloroethylene, tetrahydrofuran and toluene.

In another embodiment, the fluid is a gas. Suitable gases include, but are not limited to, oxygen, carbon dioxide, water vapor, nitrogen, methane, chlorine, hydrogen sulfide, refrigerants. In an embodiment, the gas comprises oxygen, carbon dioxide and water vapor.

In another embodiment, the fluid is a house hold chemical. Suitable house hold chemicals include, but are not limited to, bleach, detergents, softeners, soaps, cosmetics (deodorant, shampoo, conditioner, perfume), disinfectants, air fresheners, insecticides, pesticides, and herbicides.

In another embodiment, the fluid is a mixture of one or more of hydrocarbon fuels, organic liquids, inorganic liquids, gases and house hold chemicals.

In an embodiment, there is an article for storage or transport of a fluid comprising the multilayer structure as disclosed hereinabove, in a form of a housing provided with a port for introducing chemical in an enclosure defined by the housing, wherein the multilayer structure provides permeation barrier to the chemical. The article may further comprise means for closing the port, such that upon closing the port, the material is isolated from the outside environment. The article may comprise one or more of a fuel container, a fuel container and a lid, or a fuel container and a closure.

As used herein, the term "fuel container" refers to fuel containers mounted on automobiles, motor cycles, ships, airplanes, electric generators, and other industrial and agricultural machines, and potable containers for supplying fuels to the fuel containers and also containers for storing fuels to be used for driving such machines.

In an embodiment, the article is in a form of a fuel canister. In another embodiment, the article is in a form of a fuel valve. In yet another embodiment, the article is in a form of a fuel inlet. In one embodiment, the article is in a form of a fuel filler neck. In an embodiment, the article is in a form of a fuel tank. In another embodiment, the article is in a form of a fuel line.

The article as disclosed herein above comprising a polymer comprising PTF can be used for any suitable application, including, but not limited to food and drug packaging, medical devices, personal care products, electronics and semiconductors, paints and coatings, and chemical packaging.

Additives

One or more of the barrier layer 210, 310, 410; the first or the second structural layer 211, 311, 411, 421; and the tie layer 312 described hereinabove may contain one or more additives including, but not limited to, antioxidants, plasticizers, UV light absorbers, antistatic agents, flame retardants, lubricants, colorants, fillers and heat stabilizers.

Suitable antioxidants include, but are not limited to, 2,5-di-tert-butylhydroquinone, 2,6-di-tert-butyl-p-cresol, 4,4'-thiobis-(6-tert-butylphenol), 2,2'-methylene-bis-(4-methyl-6-tert-butylphenol), octadecyl-3-(3',5'-di-tert-butyl-4'-hydroxyphenyl) propionate, 4,4'-thiobis-(6-tert-butylphenol), etc.

Suitable UV light absorbers include, but are not limited to, ethylene-2-cyano-3,3'-diphenyl acrylate, 2-(2'-hydroxy-5-methylphenyl)benzotriazole, 2-(2'-hydroxy-5-methylphenyl)benzotriazole, 2-(2'-hydroxy-3'-tert-butyl-5'-methylphenyl)-5-chlorobenzotriazole, 2-hydroxy-4-methoxybenzophenone, 2,2'-dihydroxy-4-methoxybenzophenone, 2-hydroxy-4-methoxybenzophenone, etc.

Suitable plasticizers include, but are not limited to, phthalic acid esters such as dimethyl phthalate, diethyl phthalate, dioctyl phthalate, waxes, liquid paraffins, phosphoric acid esters, etc.

Suitable antistatic agents include, but are not limited to, pentaerythritol monostearate, sorbitan monopalmitate, sulfated polyolefins, polyethylene oxide, carbon wax, etc.

Suitable lubricants include, but are not limited to, ethylene bisstearoamide, butyl stearate, etc.

Suitable colorants include, but are not limited to, carbon black, phthalocyanine, quinacridon, indoline, azo pigments, red oxide, etc.

Suitable filler include, but are not limited to, glass fiber, asbestos, ballastonite, calcium silicate, talc, montmorillonite, etc.

The transesterified blend compositions of the present disclosure provide numerous advantages such as improvement in barrier properties as well control of crystallization and melting temperatures. Furthermore, in certain cases of high B values crystallization can be limited to produce materials with sufficiently low crystalline content, composed of the transesterified blend compositions, useful for applications such as heat seal or thermal welding applications.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the phrase "one or more" is intended to cover a non-exclusive inclusion. For example, one or more of A, B, and C implies any one of the following: A alone, B alone, C alone, a combination of A and B, a combination of B and C, a combination of A and C, or a combination of A, B, and C.

Also, use of "a" or "an" are employed to describe elements and described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

In the foregoing specification, the concepts have been disclosed with reference to specific embodiments. However, one of ordinary skill in the art appreciates that various modifications and changes can be made without departing from the scope of the invention as set forth in the claims below.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all embodiments.

It is to be appreciated that certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges include each and every value within that range.

The concepts disclosed herein will be further described in the following examples, which do not limit the scope of the invention described in the claims.

The examples cited here relate to transesterified furan-based polyesters. The discussion below describes how compositions comprising transesterified furan-based polyester and articles made therefrom are formed.

EXAMPLES

Test Methods

Molecular Weight by Size Exclusion Chromatography

A size exclusion chromatography system, Alliance 2695™ (Waters Corporation, Milford, Mass.), was provided with a Waters 2414™ differential refractive index detector, a multi-angle light scattering photometer DAWN Heleos (Wyatt Technologies, Santa Barbara, Calif.), and a ViscoStar II™ differential capillary viscometer detector (Wyatt). The software for data acquisition and reduction was ASTRA® version 6.1 by Wyatt. The columns used were two Shodex GPC HFIP-806M™ styrene-divinyl benzene columns with an exclusion limit of $2 \times 10^7$ and 8,000/30 cm theoretical plates; and one Shodex GPC HFIP-804M™ styrene-divinyl benzene column with an exclusion limit $2 \times 10^5$ and 10,000/30 cm theoretical plates.

The specimen was dissolved in 1,1,1,3,3,3-hexafluoro-2-propanol (HFIP) containing 0.01 M sodium trifluoroacetate by mixing at room temperature with moderate agitation for four hours followed by filtration through a 0.45 μm PTFE filter. Concentration of the solution was circa 2 mg/mL.

The chromatograph and associated detectors temperature controlled at 40° C., with mobile phase flow rate of 0.5 mL/min. The injection volume was 100 μL. The run time was 80 min. Data reduction was performed incorporating data from all three detectors described above. Eight scattering angles were employed with the light scattering detector. No standards for column calibration were involved in the data processing.

Intrinsic Viscosity

Intrinsic viscosity (IV) was determined using the Goodyear R-103B Equivalent IV method, using PET T-3, DuPont™ Selar® PT-X250, DuPont™ Sorona® 2864 as calibration standards on a Viscotek® Forced Flow Viscometer Model Y-501C. Methylene chloride was the carrier solvent, and a 50/50 mixture of methylene chloride/trifluoro acetic acid was the polymer solvent. Samples were prepared at 0.4% (w/v), and shaken overnight at room temperature.

Differential Scanning Calorimetry

A standard aluminum pan was loaded with 5-10 mg of sample and loaded into the instrument. Modulated DSC was run from −50° C. to 300° C. at a 3° C./min heating rate and a modulation of 0.5° C. every 60 seconds in a nitrogen atmosphere. The glass transition temperature $T_g$ was determined as the half height between the tangent lines drawn before and after the baseline shift associated with the glass transition in the reversing signal. The total heat signal was used to determine the peak temperatures and enthalpies of the cold crystallization exotherm ($T_{cc}$, $\Delta H_{cc}$) and melting endotherm ($T_m$, $\Delta H_m$). To determine the enthalpies of cold crystallization and melting ($\Delta H_{cc}$ and $\Delta H_m$, respectively) the area between the curve and the base line (below the curve for exotherms and above the curve for endotherms) are integrated and normalized to the total sample mass in order to obtain J/g.

Elemental Analysis

An accurately-weighed aliquot of the sample (~1 g) was microwave digested (CEM Star 2) starting with 4 mL of concentrated sulfuric acid (98.0%) and 10 mL of concentrated nitric acid (69%). The microwave was programmed to reach a temperature of 250° C. and was held for 10 minutes. At each 1 minute interval, 1 mL of concentrated nitric acid was added to the black char until the sample became colorless. The digested sample was then brought to a 100 mL final volume with de-ionized water.

This prepared sample was then analyzed on a Perkin Elmer Optima 5300 ICP-OES Radial View for 40 elements. Three custom made analytical standards were acquired commercially from Inorganic Ventures. The three standards were diluted with concentrated nitric acid and de-ionized water to produce standards at the following levels: 10, 1, 0.1 and blank ppm. Calibration standards and diluted samples were analyzed and spectral intensities were determined electronically.

The calibration standard curve was generated by regression analysis using the intensities of the calibration standard solutions. Measured elemental concentrations for samples were determined by applying the intensities from triplicate readings of each sample to the calibration curve. The elemental concentrations were then calculated back to the original sample to quantify the amount of each element as µg/g in the sample.

Interaction Polymer Chromatography (IPC)

IPC was used to monitor the degree or amount of transesterification in a polyester blend and also to characterize chemical composition heterogeneity and microstructure of polyester blends using an Alliance 2690™ chromatography system from Waters Corporation (Milford, Mass.), with a Waters PDA UV/Vis spectrometer model 2996 and Evaporative Light Scattering detector ELSD 1000 from Agilent Technologies (US). A NovaPak™ C18 silica-based 4.6×150 mm HPLC column from Waters was used with a $H_2O$-1,1,1,3,3,3-hexafluoro-2-propanol (HFIP) linear gradient (from 20 to 100% HFIP) mobile phase. Chromatography was run at 35° C., 0.5 mL/min flow rate, with UV spectrum extracted at various wavelengths, using an injection volume of 10 uL. Data was collected and analyzed with Waters Empower Version 3 software, customized for IPC analyses.

Samples were prepared by dissolution in neat HFIP for at least 4 hours at room temperature with moderate agitation. All initial sample concentrations are selected close to 1 mg/mL. All sample solutions are filtered with 0.45 µm PTFE membrane filter prior to injection into the chromatographic system. Due to day to day variations in the retention times, relevant homopolymers solutions were run in conjugation with blended samples.

Transesterification Determination by IPC

The degree of transesterification was determined by an IPC method. This approach allows for separation of complex polymers by polarity (chemistry) of the polymer chains rather than their molecular size, which makes this approach complementary to size exclusion chromatography (SEC). When applied to polymer and/or copolymer blends, IPC separates macromolecules by chemical composition and microstructure, e.g. degree of blockiness. Thus, as shown in Y. Brun, P. Foster, *Characterization of synthetic copolymers by interaction polymer chromatography: separation by microstructure*, J. Sep. Sci. 2010, v. 33, pp. 3501-351, the copolymer chains elute between corresponding homopolymer chains, and the retention always increases with degree of blockiness. For example, a statistical A/B (50/50) copolymer elutes later than the alternating copolymer, but before a block-copolymer with same (50/50) composition. When a copolymer sample contains chains with various chemical compositions, the IPC fractionates them by this composition, and in such way reveals chemical composition distribution of the copolymer. Similarly, the estimation of chemical heterogeneity by chain microstructure (blockiness) could be also obtained from the IPC experiments.

An IPC method was developed to separate blends of aromatic and furan-based polyesters by chemistry of the polymer chains to estimate the degree of transesterification in polymer chains. In the extreme case of a polymer blend without any exchange reaction, the resulting IPC trace will produce two peaks corresponding to original homopolymers. In another extreme case of full transesterification, a single narrow peak corresponding to random copolymer will elute in the position between the two homopolymer peaks. The retention time of this peak apex is dependent on the composition of the copolymer and the degree of its blockiness, which could be quantified through the blockiness index (B)-number (see description below). In all intermediate cases of partial transesterification, the IPC chromatogram will be described by a broad multimodal curve, representing fractions of different degree of transesterification.

NMR Analysis for Determination of Blockiness Index (B value) Transesterified Blends (t-Blend) Comprising t-PET and t-PTF (t-PET/t-PTF):

NMR Data Collection: $^{13}C$ NMR spectra were obtained in two ways: A1) on samples of typically 15-20 mg (50 mg for random polymers) of polymer in 0.5 mL 1,1,2,2-tetrchloroethane-d2 at 120° C. on a Bruker 500 MHz NMR with a H—C cryoprobe. The $^{13}C$ NMR spectra were obtained using a 45 or 90 degree pulse and a 5 sec recycle delay and a 0.64 sec acquisition time with inverse gated proton decoupling. Repeats of the 90 degree data with a 45 degree pulse showed essentially identical spectra, indicating that the T1's of the similar carbons are very similar, as expected. An alternate preferred method for 13C data is A2) 30-35 mg of sample is dissolved in 0.5 ml of 1,1,2,2-tetrchloroethane-d2 containing 0.025 or preferably 0.05 M Chromium(III) acetylacetonate (Cr(AcAc)3) and C13 NMR spectra obtained at 120 C (preferably on a 5 mm HC 500 MHz Bruker cryoprobe) using inverse gated decoupling, an acquisition time of 1 sec, a recycle delay of 5 sec, a 90 degree pulse and about 12-20 hrs total acquisition time. Spectra are processed using zero fill to 512 k and a line broadening of 0.5 or 1 hz and automatic baseline correction. Spectra using Cr(AcAc)3 were referenced using the tce-d2 peak at 74.2 ppm. Additional linear offset baseline correction is important to accurately deconvolute regions with small peaks. All samples were run using data acquisition method A2 except as noted.

NMR Analysis: As described above, the blockiness index, B, is defined by Devaux, op. cit., as (Devaux, J.; Godard, P.; Mercier, J. P. *J. Pol. Sci. Pol. Phys.* 1982, 20, 1875.)

$$B = F_{A_iB_j}\left(\sum_{i=1}^{2}\frac{1}{F_{A_i}}\right)(i \neq j)$$

wherein $F_{AiBj}$ represents the total mole fraction of the first, $A_i$ (A1 & A2) and second, $B_j$ (B1 & B2) repeat units adjacent to one another, in either order, and $F_{Ai}$ represents the mole fraction of repeat units of type "i" and the sum is taken over the two types of repeat units.

This equation can be implemented in several ways:
1) $B=F_{A1B2}*(1/F_{A1}+1/F_A A$
2) $B=F_{A2B1}*(1/F_{A1}+1/F_A A$
or
3) the average of $F_{A1B2}$ and $F_{A2B1}$ can be used $F_{A1}=F_{A1B1}+F_{A1B2}$
$F_{A2}=F_{A2B1}+F_{A2B2}$ These fractions $F_{A1}$ and $F_{A2}$ are generally calculated from the weight fraction of the two homopolymers used in the experiments.

The $F_{B2A1}$ is equal to the integral of B2A1 peak divided by the sum of the integrals of all four fractions: A1B1+A1B2+A2B1+A2B2

Similarly for $F_{B1A2}$.

Peak assignments and sources for these different integrals are discussed below. Note that all peaks can shift slightly with Chromium(III) acetylacetonate ($Cr(acac)_3$) or small shifts in temperature. Peaks are corrected for any small overlapping peaks not part of the analysis by subtracting values obtained from analysis of the homopolymers. For example, a very small peak from dipropylene glycol in the PTT homopolymer must be subtracted out from the 2F signal at about 63.2 ppm.

Figure 5:
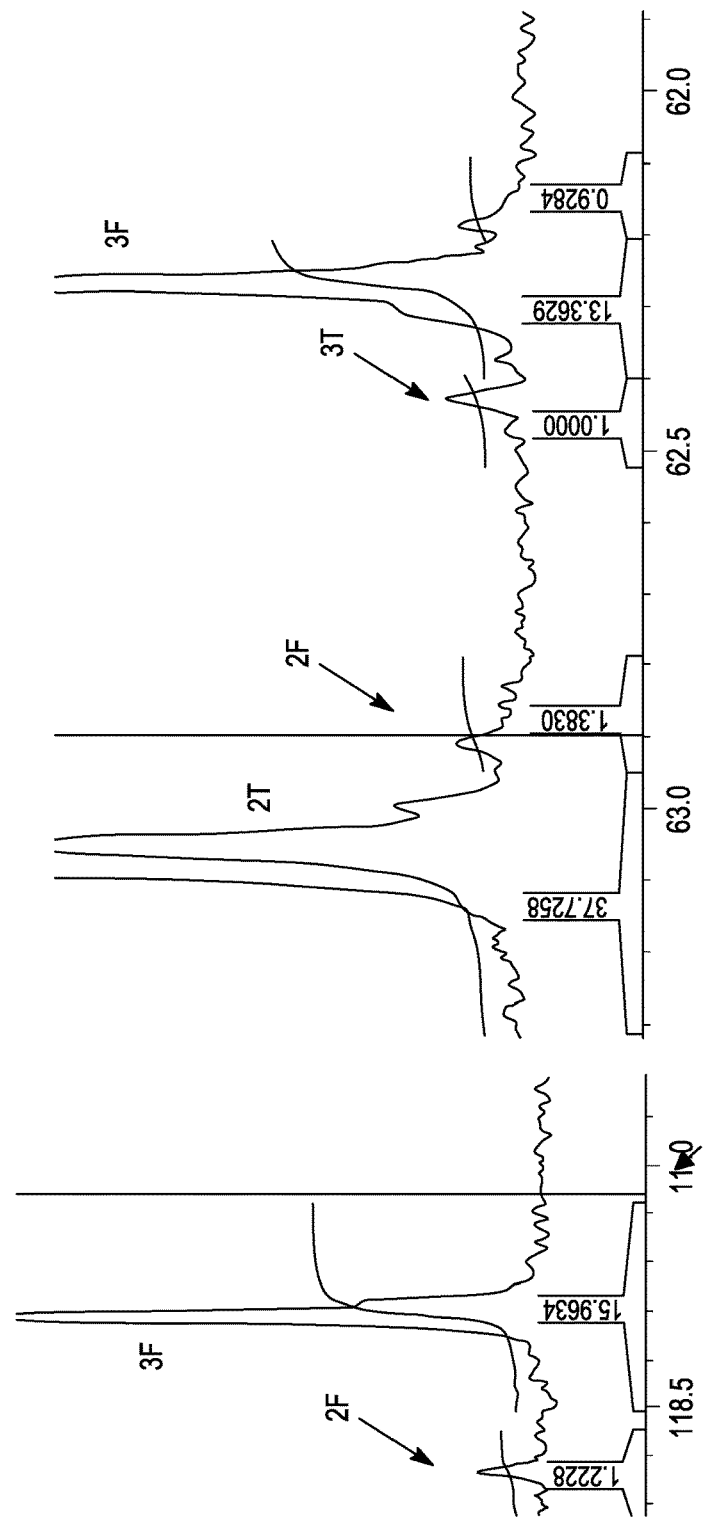
FIG. 5 depicts an exemplary NMR spectrum of a transesterified-blend (t-Blend) composition comprising a transesterified poly(trimethylene furandicarboxylate) (t-PTF) and a transesterified poly(ethylene terephthalate) (t-PET).

$^{13}C$ NMR reveals several peaks (arrows) which are unique to the transesterified-blends PET/PTF are shown in FIG. 5, and indicate transesterification. Note that in the example of FIG. 5, $Cr(acac)_3$ was not used. About 0.1-0.2 ppm should be added to the position of each peak in FIG. 5 (which was referenced by an older method and did not use $Cr(acac)_3$) to match the peak assignments below.

These peaks indicate that furan and 3G (trimethylene glycol group) monomers, originally from the PTF are chemically positioned next to the TPA and 2G monomer units from the PET.

In this case,

A1=2G; B1=T; A2=3G; B2=F

Where $F_{A1}$ is the mole fraction of 2GT or 2T and FA2 is the fraction of 3GF or 3F. As noted above, either $F_{A1B2}$ or $F_{A2B1}$ or their average can be used to calculate B. The peak areas arising from transesterification are determined by either curve deconvolution or integration. The exact NMR peaks used and the method used to determine the peak area was chosen to provide the best fit to the data, and calculations were done as described in the methods below. Method 1 is generally preferred if the B value is above about 0.12 and Method 2 is generally preferred if the B value is below 0.12.

NMR methods M1 and M2 refer to peak positions found in the presence of 0.05M Cr(AcAc)3. Use of Cr(AcAc)3 is our preferred data collection method, A2.

C13 NMR Analysis Method 1 (M1): In most cases for B values above about 0.12, the integral values of the peaks are determined by deconvolution (in some cases, at low levels, with a 'fixed' line width of the smallest peak equal to about the average of the larger 2 peaks).

A1B1 peak 2T for CH2 of 2G next to T, at ~63.2 ppm
A1B2: peaks 2F for CH2 of 2G next to F, at ~63.02-63.1 ppm
A2B2: 3F First, convert to diad from triad=z+y/2 from peaks x, y, z at 28-29 ppm: 28.66 ppm x:T3T, 28.57 ppm y: F3T and T3F, 28.47 ppm z:F3F, then multiply by two to account for change from peaks representing 2 carbons at ~62 ppm to peaks representing 1 carbon at 28-29 ppm
A2B1: 3T First convert to diad from triad=x+y/2 from peaks x, y, z at 28-29 ppm: 28.66 ppm x:T3T, 28.57 ppm y: F3T and T3F, 28.47 ppm z:F3F, then multiply by two to account for change from peak representing 2 carbons at ~62 ppm to peak representing 1 carbon at 28-29 ppm Above about 0.12 B value, deconvolution of 2F and 3T seems to work well for both and the numbers agree well, so the average is used.

C13 NMR Analysis Method 2 (M2): At very low levels of transesterification, 2F cannot be measured easily in the 63 ppm region, so only F3T peaks (62.47-62.61 ppm region) from one of the OCH2 are used. At very low B values, where T3T triad does not exist, the peaks at 62.47-62.61 ppm can be integrated and used to determine A2B1 3T, the remaining area of the 62 region less than about 62.47 ppm then can be used to represent A2B2, 3F. This integration is better than deconvolution for accurate determination of very small highly overlapped peaks. It is also preferred at low levels because the total area at 62 ppm is two carbons, so the Signal to Noise is better.

C13 Analysis Method 3 (M3): When B values are in the range of about 0.1, B values can also be determined from the average for 2F at ~63.02-63.1 ppm and 3T at 62.47-62.61 ppm (M3). 2F can be measured by deconvolution at 63.02 ppm or integration. In cases where 2F and 3T values do not agree, the integration of 3T alone is preferred in the 62 ppm region (Method 2) as long as the T3T triad is not observed in the 28 ppm region.

C13 NMR Analysis Method 4 (M4). An alternate possible region to determine 2F A1B2 is the 118 ppm region of the spectrum. This was not used in the examples given here. If this is used, care should be taken that the total area represents an integral carbons, that any losses due to T1 differences are accounted for.

Transesterified Blends (t-Blend) Comprising t-PET and t-PTF (t-PET/t-PEF):

NMR Data Collection: Method A3 was used for all PET/PEF samples. Data Acquisition method A3: H1 NMR spectra were collected using a 700 MHz NMR on 9 mg samples in 0.6 ml 1,1,2,2-tetrachlorethane-d2 at 120 C using an acquisition time of 10 sec, a 90 degree pulse, and a recycle delay of 30 sec, and with 16 transients averaged. Spectra were referenced to the residual tce-d2 proton peak at 5.928 ppm.

NMR Data Analysis: Areas of the 4 CH2 NMR signals in the H1 NMR spectrum in the region of 4.56 to 4.70 ppm were used to determine the B value: T2T at 4.660-4.664 ppm; F2T,T2F at about 4.641 and 4.636 ppm; F2F at about 4.606-4.612 ppm. The areas of these 4 peaks were determined by deconvolution. B value was then calculated according to the method of Deveaux, with the average of the central F2T and T2F peaks used.

Transesterified Blends (t-Blend) Comprising t-PTT and t-PTF (t-PTT/t-PTF):

NMR Data collection: Data were collected as described for PTF/PET samples, A2. Spectra using Cr(AcAc)3 were referenced using the tce-d2 peak at 74.2 ppm.

NMR Data Analysis: Spectra were processed using zero fill to 512 k data points, a line broadening of 0.5 or 1 hz and baseline correction. Further linear offset baseline correction used for deconvolution region. Spectra were deconvoluted to determine the integral value of each CH2 peak (central CH2 of the 3G unit) shown in the 28-29 ppm region. T3T: 28.66 ppm; F3T and T3F 28.57 ppm, F3F 28.47 ppm. If needed, the width of the smallest peak was fixed to about the average of the two larger peaks. Calculations were according to Deveaux, $B=((F_{F3T}+F_{3TF})/2)*(1/F_{PTF}+1/F_{PTT})$.

FIG. 10 shows C13 NMR spectra obtained on a Bruker 500 MHz NMR using about 15-50 mg of polymer/0.5 ml of tce-d2 at 120 C. The tce-d2 peak was referenced to 74.2 ppm. The C13 NMR peak positions in ppm are slightly shifted from those discussed in C13 NMR analysis methods M1 and M2 as the samples in this figure do not contain Cr(AcAc)3. The presence of Cr(AcAc) causes slight shifts in the NMR peak positions.

Endgroups (DPG, CHDM, IPA) Analysis by NMR

NMR Data Collection: H1 NMR spectra were collected using a 500 or 700 MHz NMR on 20-25 mg samples in 0.6 ml 1,1,2,2-tetrachlorethane-d2 (tce-d2) at 120 C using an acquisition time of 4.68 sec, a 90 degree pulse, and a recycle delay of 30 sec, and with 16 transients averaged. The residual tce-d2 proton peak was used as the reference at 5.928 ppm.

NMR Analysis/Calculation method: Samples were integrated and mol % calculated as is standard in the art. Minor peaks used include 4.04 ppm (s) methyl ester end group; 3.92 ppm (t) ~OCH2CH2OH end group; 3.842 ppm (t) DEG ~OCH2CH2OCH2CH2O~, 3.77 ppm (t) ~OCH2CH2CH2OH; 3.58 ppm (t) DPG; 4.18, 4.29 ppm CHDM; IPA (s) 8.65 ppm.

Gas Barrier Testing

Produced samples (films) were tested for oxygen ($O_2$), carbon dioxide ($CO_2$) and water vapor barrier properties using MOCON instruments according to ASTM methods D3985-05 (oxygen) and F2476-05 (carbon dioxide). Results are depicted as g-mm/m²-day. Details of the test conditions are given below:

Oxygen testing:
   Testing unit: MOCON OX-TRAN® 2/61 (films)
   Temperature: 23° C.
   Permeant: 50% relative humidity
Carbon dioxide testing:
   Testing unit: MOCON PERMATRAN®™ C 4/41 (films)
   Temperature: 23° C.
   Permeant: 100% carbon dioxide, 23° C.

Materials

Poly(trimethylene-2,5-furandicarboxylate) (PTF-1) with an IV of 0.67 dL/g, $M_n$=20.7 kDa, and DPI of 1.55 and a higher molecular weight, PTF-2 were synthesized according to the methods below.

Poly(ethylene-2,5-furandicarboxylate) (PEF) with an IV of ~0.645 dL/g was synthesized according to the method below.

Poly(trimethylene terephthalate) (PTT), Sorona® K1184 with an IV of ~0.93 and acid endgroup concentration of ~7 meq/kg with a DPG content of ~1 wt % was received from the DuPont company. All materials were dried overnight under vacuum at 120° C. prior to processing.

$NaH_2PO_4$ was acquired from Sigma Aldrich

Two poly(ethylene terephthalate) copolymer resins were used; PET-1 and PET-2.

PET-1 containing ~1.6-1.5 mol % cyclohexane dimethanol (CHDM) comonomer had an IV of ~0.8 dL/g. Two grades of PET-1 were used: PET-1A was in the form of resin that had previously been blown into 12 oz bottles under standard conditions using a generic mold by Plastic Technologies, Inc. and subsequently shredded using a Retsch ZM200 mill equipped with a 6 mm screen and 6-tooth rotor and operated at 18000 rpm. PET-1B was in the form of resin pellets acquired from PTI.

PET-2 containing ~1.1-1.4 mol % isopthalic acid (IPA) comonomer had an IV of ~0.8 dL/g. Two grades of PET-2 were used: PET-2A was in the form of pellets acquired from the DuPont Company. PET-2B was in the form of pellets acquired from Auriga Polymers, Inc.

Table 1 shows $H^1$ NMR end group analysis of various PET grades used. Table 2 summarizes the impurities present in various grades of PET, as determined by ICP and Table 3 summarizes the acid end group analysis of various PET grades used hereinbelow.

TABLE 1

PET Homopolymer Composition by $H^1$ NMR

|  | PET-1A | PET-1B | PET-2A | PET-2B |
| --- | --- | --- | --- | --- |
| IPA | ND | 0.00 | 1.40 | 1.15 |
| TPA | 50.1 | 50.1 | 48.6 | 48.9 |
| EG backbone | 46.3 | 46.5 | 48.0 | 48.3 |
| EG OH end | 0.48 | 0.41 | 0.44 | 0.34 |
| DEG | 1.37 | 1.24 | 1.60 | 1.25 |
| DEG OH end | — | 0.03 | — | 0.03 |
| CHDM | 1.75 | 1.62 | ND | 0.00 |

*values are in mol %

TABLE 2

Impurities in PET homopolymers measured by ICP

|  | PET-1A | PET-1B | PET-2 |
| --- | --- | --- | --- |
| Al | <1 | <1 | <1 |
| B | 48 | 3 | 3 |
| Ca | 8 | 10 | 7 |
| Co | 4 | 4 | 45 |
| Fe | 13 | 13 | 7 |
| K | 23 | 6 | 5 |
| Na | 40 | 21 | 17 |
| P | 32 | 34 | 23 |
| Sb | 162 | 200 | 220 |
| Si | 42 | 26 | 13 |
| Ti | 2 | <1 | <1 |

TABLE 3

Acid End Group analysis of Homopolymers

|  | Mean Acid Number, (mg KOH/g) | Standard Deviation |
| --- | --- | --- |
| PET-1A | 1.49 | 0.17 |
| PET-1B | 1.38 | 0.09 |
| PET-2B | 1.44 | NA |
| PTF-1 | 5.84 | 3.02 |
| PTF-2 | 0.66 | 0.56 |

Synthesis of Polytrimethylene-2,5-furandicarboxylate (PTF-1)

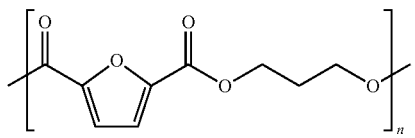

2,5-furandimethylester (147.3 g, 0.8 mol), and bioPDO™ (109.5 g, 1.44 mol) were charged to a pre-dried 500 mL three necked kettle reactor fitted with an overhead stirrer and a distillation condenser. A nitrogen purge was applied to the flask which was kept at a temperature of 23° C. Stirring was commenced at 50 rpm to form a slurry. While stirring, the flask was evacuated to 0.13 MPa and then repressurized with $N_2$, for a total of 3 cycles. After the first evacuation and repressurization, titanium (IV) isopropoxide (93 mg) was added.

After the 3 cycles of evacuation and repressurization, the flask was immersed into a preheated liquid metal bath set at 160° C. The contents of the flask were stirred for 20 min after placing it in the liquid metal bath, causing the solid ingredients to melt. Next, the stirring speed was increased to 180 rpm and the liquid metal bath setpoint was increased to 160° C. After about 20 minutes, the bath had come up to temperature, after which the metal bath setpoint was increased to 180° C. After about 20 min, the bath had come to temperature. The flask was then held at 180° C. still stirring at 180 rpm for an additional 45-60 minutes to distill off most of the methanol being formed in the reaction. Following the hold period at 180° C., the metal bath setpoint was increased to 210° C. After about 20 minutes, the bath had come to temperature. The flask was then held at 210° C. still stirring at 180 rpm for an additional 45-60 min after which the nitrogen purge was discontinued, an additional charge of titanium (IV) isopropoxide (93 mg) added, and a vacuum was gradually applied in increments of approximately 1330 Pa every 10 s while stirring continued. After about 60 min the vacuum leveled out at 6500-8000 Pa. The stirring speed was then kept between 50-180 rpm and the metal bath set point increased to 250° C. After about 20 min, the bath had come to temperature and the conditions were maintained for ~3 hours. Periodically, the stirring speed was increased to 180 rpm, and then the stirrer was stopped. The stirrer was restarted, and the applied torque about 5 seconds after startup was measured. When a torque of 75 N/cm or greater was observed, reaction was discontinued by halting stirring and removing the flask from the liquid metal bath. The overhead stirrer was elevated from the floor of the reaction vessel, the kettle removed, and the produced polymer recovered by decanting under a stream of nitrogen gas. The recovered polymer was chopped into pellets using a Wiley mill that was cooled with liquid nitrogen. The so produced polymer pellets were dried under vacuum and a weak nitrogen stream at 115° C. for 24 hours. $T_g$ was ca. 58° C. (DSC, 5° C./min, $2^{nd}$ heat), $T_m$ was ca. 176° C. (DSC, 5° C./min, $2^{nd}$ heat). $^1$H-NMR (TCE-d) δ: 7.05 (s, 2H), 4.40 (m, 4H), 2.15 (m, 2H). $M_n$ (SEC) ~20.7 kDa, PDI: 1.55 IV ~0.67 dL/g.

Synthesis of High Molecular Weight Polytrimethylene-2,5-furandicarboxylate (PTF-2)

Step 1: Preparation of a PTF Pre-Polymer by Polycondensation of bioPDO™ and FDME 2,5-furandimethylester (2557 g), 1,3-propanediol (1902 g), titanium (IV) isopropoxide (2 g), Dovernox-10 (5.4 g) were charged to a 10-lb stainless steel stirred autoclave (Delaware valley steel 1955, vessel #: XS 1963) equipped with a stirring rod and condenser. A nitrogen purge was applied and stirring was commenced at 30 rpm to form a slurry. While stirring, the autoclave was subject to three cycles of pressurization to 50 psi of nitrogen followed by evacuation. A weak nitrogen purge (~0.5 L/min) was then established to maintain an inert atmosphere. While the autoclave was heated to the set point of 240° C. methanol evolution began at a batch temperature of 185° C. Methanol distillation continued for 120 minutes during which the batch temperature increased from 185° C. to 238° C. When the temperature leveled out at 238° C., a second charge of titanium (IV) isopropoxide (2 g) was added. At this time a vacuum ramp was initiated that during 60 minutes reduced the pressure from 760 torr to 300 torr (pumping through the column) and from 300 torr to 0.05 torr (pumping through the trap). The mixture, when at 0.05 torr, was left under vacuum and stirring for 5 hours after which nitrogen was used to pressurize the vessel back to 760 torr.

The formed polymer was recovered by pushing the melt through an exit valve at the bottom of the vessel and into a water quench bath. The thus formed strand was strung through a pelletizer, equipped with an air jet to dry the polymer free from moisture, cutting the polymer strand into chips ~¼ inch long and ~⅛ inch in diameter. Yield was approximately 2724 g (~5 lbs). $T_g$ was ca. 58° C. (DSC, 5° C./min, $2^{nd}$ heat), $T_m$ was ca. 176° C. (DSC, 5° C./min, $2^{nd}$ heat). $^1$H-NMR (TCE-d) δ: 7.05 (s, 2H), 4.40 (m, 4H), 2.15 (m, 2H). $M_n$ (SEC) ~10 300 D, PDI 1.97. IV ~0.55 dL/g.

Step 2: Preparation of High Molecular Weight PTF Polymer by Solid Phase Polymerization of the PTF Pre-Polymer of Step 1

In order to increase the molecular weight of the PTF pre-polymer (described above) solid phase polymerization was conducted using a heated fluidized nitrogen bed. The quenched and pelletized PTF pre-polymer was initially crystallized by placing the material in an oven, subsequently heating the pellets under a nitrogen purge to 120° C. for 240 minutes. At this time the oven temperature was increased to ~168° C. and the pellets left under nitrogen purge condition to build molecular weight during a total duration of 96 hours. The oven was turned off and the pellets allowed to cool. The obtained pellets had a measured IV ~0.99 dL/g.

Synthesis of Poly(ethylene-2,5-furandicarboxylate) (PEF)

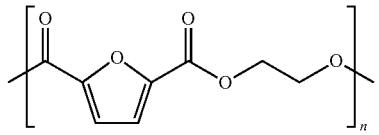

2,5-furandimethylester (300 g, 1.63 mol), and ethylene glycol (202.4 g, 3.26 mol) were charged to a pre-dried 500 mL three necked kettle reactor fitted with an overhead stirrer and a distillation condenser. A nitrogen purge was applied to the flask which was kept at a temperature of 23° C. Stirring was commenced at 50 rpm to form a slurry. While stirring, the flask was evacuated and then repressurized with $N_2$, for a total of 3 cycles. After the first evacuation and repressurization, titanium (IV) isopropoxide (176 mg) was added.

After the 3 cycles of evacuation and repressurization, the flask was immersed into a preheated liquid metal bath set at 160° C. The contents of the flask were stirred for 20 min after placing it in the liquid metal bath, causing the solid ingredients to melt. Next, the stirring speed was increased to 180 rpm and the liquid metal bath setpoint was increased to 180° C. After about 20 minutes, the bath had come up to temperature. The flask was then held at 180° C. still stirring at 180 rpm for an additional 45-60 minutes to distill off most of the methanol being formed in the reaction. Following the hold period at 180° C., the metal bath setpoint was increased to 210° C. After about 20 minutes, the bath had come to temperature. The flask was then held at 210° C. still stirring at 180 rpm for an additional 45-60 min after which the nitrogen purge was discontinued, an additional charge of titanium (IV) isopropoxide (176 mg) added, and a vacuum was gradually applied in increments every 10 s using a vacuum ramp controller while stirring continued. After about 30 min set controller to full vacuum which then leveled out at 100 mTorr. The stirring speed was then kept at 180 rpm and the metal bath set point increased to 250° C. After about 20 min, the bath had come to temperature and the conditions were maintained for ~3 hours.

Gradually the stirring speed was decreased as torque increased. When a torque of >90 N/cm was observed the stirring speed was decreased in half from the previous set speed. This was continued until stirring speed was at 50 rpm with a torque reading of >90 N/cm was achieved and at this point the reaction was stopped. The vacuum was replaced with nitrogen, halted stirring, and the metal bath lowered. While still hot, the reactor bottom was disconnected and lowered away from the stirrer. Polymer was cut from stirrer and then the hot polymer was decanted from the reactor and placed on a Teflon coated metal sheet and allowed to cool and harden. The recovered polymer was broken into pieces (1"×1") and then chopped into pellets using a Wiley mill that was cooled with liquid nitrogen. The produced polymer pellets were dried under vacuum and a weak nitrogen stream at 145° C. for 24 hours. The pellets were sifted to remove fines and then solid phased at 200° C. under nitrogen to an IV of ~0.645 dL/g.

Film Preparation

Pellets or extruded strands or melt cut into small pieces and were dried for a minimum of 6 hours in a vacuum oven at 100° C., under vacuum with nitrogen flow. After drying, a Pasadena PHI P-215C heated press was set to ~20° C. above the melting point of the polymers to be pressed. Once the desired temperature was achieved, ~1 g of dried sample was placed between two preheated ⅛" metal plates topped with a release layer of Tear & Crease Resistant fiberglass fabric coated with PTFE of thickness 0.025 cm (0.010 in) cut from a 101.6 cm (40 in) wide roll received from CS Hyde Company (Lake Villa, Ill.).

The upper press platen was then lowered until contact was made with the top of the samples. After ~3 minutes of temperature equilibration, pressure was slowly increased on the sample to 5,000 LB (~156 PSI) over 30-60 seconds. The sample was then left for 30 seconds at pressure, after which, it was quickly removed from the press and quenched flat quenched on ice.

Example 1: Preparation of Transesterified-Blend Compositions (t-Blend) from PTF and PET-IPA Containing Copolymers (PET-2) Via Melt Blending Blends were prepared in a DSM microcompounder under a nitrogen purge at 100 RPM. The DSM system is a computer controlled 15 cubic centimeter (cc), co-rotating, intermeshing (self wiping), 2-tipped, conical twin-screw machine with a recirculation loop, discharge valve, nitrogen purge system, and with three different heating zones. Set point temperatures for all 3 heating zones were the same in each case. The melt temperature is taken as the set point temperature. Following the given mixing time the discharge valve was opened and an extruded ~⅛ inch diameter strand collected after quenching in non-heated water (T~20° C.).

Under nitrogen PTF-1 or 2 and PET-1A or 1B were charged (18 g total charge) to the DSM microcompounder, and stirred with a speed of 100 RPM for a total mixing time of 5-7 minutes. Dried PTF and PET resin were weighed and combined in an aluminum pan prior to charging into the compounder. The experimental conditions are summarized in Table 4. Control samples were produced by processing under the same conditions as the blends.

TABLE 4

Melt Processing Conditions

| | Melt Blending Conditions | | Polymer Charge (g) | | | |
|---|---|---|---|---|---|---|
| Sample | Mixing time (min) | Extruder Set Point/Melt Temperature (° C.) | PTF-1 | PTF-2 | PET-2A | PET-2B |
| Control PTF-1 | 6 | 265 | 18 | — | — | |
| Control PET-2A | 5 | 275 | 0 | — | 18 | |
| Example 1.1 | 5 | 275 | 2.25 | — | 15.75 | |
| Example 1.2 | 5 | 275 | 4.5 | — | 13.5 | |
| Example 1.3 | 5 | 265 | | 4.5 | | 13.5 |
| Example 1.4 | 5 | 275 | | 4.5 | | 13.5 |

Table 5 summarizes thermal properties obtained from modulated DSC, B value calculated from NMR and the elution times obtained from IPC for blends of poly(trimethylene furandicarboxylate) (PTF) and poly(ethylene terephthalate) based on PET-2A and B. IPC chromatograms for transesterified polyesters displayed a single eluting peak, indicating that these materials are not merely miscible blends, but are transesterified copolymers. This single peak elution behavior indicates that there is little to no population of PET or PTF homopolymer chains remaining in the composition. Conversely, a blended polymer with little or no transesterification would elute two separated peaks, with a position and intensity relative to the polymer chemistry and concentration, respectively. Bracketed numbers in the IPC retention time columns indicate the apex elution of the respected homopolyester. B value increases at higher processing temperatures, indicating an increase in randomization of the FDCA, PDO, EG and TPA groups in the backbone. Generally a single $T_g$ is observed in the range of 70-89° C. from modulated DSC. For Example 1.4 two $T_g$s were observed, indicating incomplete mixing, however these were significantly shifted from their theoretical values for a completely phase separated system.

TABLE 5

Thermal Properties, NMR B values and IPC Elution Times

| Sample | % PTF by weight | $T_g$* (° C.) | $T_{cc}$ (° C.) [$\Delta H_{cc}$ (J/g)] § | $T_m$ (° C.) [$\Delta H_m$ (J/g)] § | NMR B value | Elution Time, PTF rich [PTF homopolymer] (minutes) † | Elution Time, PET rich [PEF homopolymer] (minutes) † |
|---|---|---|---|---|---|---|---|
| PTF (Control) | 100% | 56.7 | 119.5 [40.2] | 177.2 [36.5] | | 32.82 | ND |
| PET-2A (Control) | 0% | 88.8 | ND | 147.1 [2.4], 249.0 [35.1] | | ND | 34.12 |
| Example 1.1 | 12.5% | 78.8 | ND | 150.9 [2.7], 244.1 [36.4] | | 33.98 [32.82 – 34.12] | |
| Example 1.2 | 25% | 69.6 | ND | 138.5 [2.6], 235.7 [26.0] | ~0.11‡ (A1, M3); ~0.053 (A2, M2) | 33.77 [32.82 – 34.12] | |
| Example 1.3 | 25% | 67.8 | 132.1 [19.4] | 233.4 [25.6] | 0.034 (M2) | 30.45 [25.50 – 30.69] | |
| Example 1.4 | 25% | 61.2, 68.6 | 138.2 [13.04] | 226.8 [13.7] | 0.13 (M1) | 30.37 [25.50 – 30.69] | |

*Value from reversing signal
§ Value from total heat signal
† UV-270 nm chromatograms
‡NMR behavior indicated the presence of metal particles in these samples which increased error and decreased resolution in these samples. This was confirmed on previous samples run by the same method and melt processed with same equipment. Note that in this sample, Cr(acac)$_3$ was not used, as the data acquisition method was A1. Because of the problems in the NMR data acquisition most likely from the presence of metal particles, this sample was repeated using method A2, and the value obtained is slightly different. This difference may be due to higher Signal to Noise of method A2 or to variability in the NMR data acquisition from the likely presence of metal particles or even to variability in the sample due to the smaller sample size in method A1.

Example 2: Controlling Transesterification Using Inhibitor to Obtain Transesterified-Blend Compositions (t-Blend) with High and Low B Values All materials were dried at 120° C. overnight under vacuum prior to processing. Blends were prepared in a Brabender Plasti-Corder® Lab-Station equipped with a type 6 batch mixer head preheated to 275° C. with a nitrogen blanket delivered through ram. Preweighed PET-2B was fed into the mixer at a rate that avoided over-torquing and mixed until the torque stabilized (~3 minutes), preweighed PTF-2 (IV~1) was added and the blend was mixed for 10 minutes at 75 RPM. Total mixer charge was 50 g. Samples were collected by reversing the blade rotation and scooping melt out of the mouth of the mixer. The brabender is expected to provide better mixing than the DSM microcompounder used in the Example 1. The experimental melt blending conditions are summarized in Table 6.

TABLE 6

Melt Blending Conditions

| Sample | % PTF, by weight | Mixing time (min) | Temp Set Point (° C.) | Melt Temp (° C.) | Polymer Charge (g) PTF-2 | Polymer Charge (g) PET-2B | Inhibitor (NaH$_2$PO$_4$) Charge (g) |
|---|---|---|---|---|---|---|---|
| Example 2.1 | 10% | 10 | 275 | 290 | 5 | 45 | — |
| Example 2.2 | 25% | 10 | 275 | 290 | 12.5 | 37.5 | — |
| Example 2.3 | 75% | 10 | 275 | 287 | 37.5 | 12.5 | — |
| Example 2.4 | 10% | 10 | 275 | 288 | 5 | 45 | 0.5 |
| Example 2.5 | 25% | 10 | 275 | 289 | 12.5 | 37.5 | 0.5 |
| Example 2.6 | 75% | 10 | 275 | 284 | 37.5 | 12.5 | 0.5 |
| Example 2.7 | 25% | 3 | 255 | 263 | 12.5 | 37.5 | 0.5 |
| Example 2.8 | 25% | 5 | 255 | 263 | 12.5 | 37.5 | 0.5 |
| Example 2.9 | 25% | 5 | 255 | 265 | 12.5 | 37.5 | — |

The molecular weight of the transesterified blend compositions of Examples 2.1-2.3 are reported in Table 7. A decrease in molecular weight is observed at 25 and 75% PTF concentration due to thermal and hydrolytic degradation at melt blending temperatures (~290° C.), which is well above the melt point of PTF ($T_m$ was ca. 176° C.).

TABLE 7

SEC data

| Sample | % PTF, by weight | Mn (kDa) | Mp (kDa) | Mw (kDa) | Mz (kDa) | Polydispersity (Mw/Mn) | dn/dc (mL/g) |
|---|---|---|---|---|---|---|---|
| Example 2.1 | 10% | 27.92 | 56.91 | 55.65 | 80.79 | 1.99 | 0.235 |
| Example 2.2 | 25% | 18.89 | 41.94 | 44.76 | 68.35 | 2.37 | 0.234 |
| Example 2.3 | 75% | 12.84 | 23.75 | 28.43 | 45.25 | 2.21 | 0.232 |
| Control PET-2B | — | 23.52 | 62.24 | 58.38 | 87.63 | 2.48 | 0.235 |
| Control PTF-2 | — | 20.41 | 39.62 | 51.13 | 84.57 | 2.5 | 0.231 |

The thermal properties from modulated DSC, B value calculated from NMR and elution times obtained from IPC are summarized in Table 8. The B values observed in the Examples 2.1-2.3 are in the range of 0.3-0.75 are significantly higher than those observed in Example 1 due to the higher melt processing temperature, higher shear and longer times used in these Examples as compared to those used in the Examples 1.1-1.4, indicating further randomization of the polymer chain. This degree of randomness increases with increasing PTF concentration. As shown by Examples 1.1-1.4, Examples 2.1-2.3 also show only one elution time as observed in IPC. Furthermore, Examples 2.1-2.3 show only one $T_g$, which appears to be dependent on the PTF concentration; decreasing from 74.4° C. to 58.3° C. with increasing PTF content from 10 wt % to 75 wt % respectively. The cold crystallization temperature also showed an increase between 10 to 25% PTF, but with a decrease in magnitude, while the melting temperature is suppressed. No crystallization or melting is observed for 75% PTF.

The addition of a phosphorous based inhibitor, as is commonly used in the art, is very effective at limiting transesterification, but not eliminating it. Examples 2.4-2.6 were repeated with inhibitor at the same composition and processing temperatures, as Examples 2.1-2.3. The B value was found to be reduced from 0.31, 0.40, and 0.75 for 10, 25 and 75% PTF (Examples 2.1, 2.3, and 2.3) respectively, to 0.01-0.03 (Examples 2.4, 2.5, 2.6), indicating that these compositions are very blocky. Furthermore, Examples 2.4 and 2.5 for 10 and 25% PTF showed two elution peaks in IPC, indicating a fraction of the chains are eluting with similar characteristics as their starting homopolymers. However, in all melt-processed copolymers, elution peaks are found to shift in apex retention time and peak intensity relative to their homopolymers components. This is an indication that statistically, all populations of the original homopolymers in the melt-processed blends have been affected by transesterification exchange reactions, even in very low or non-determinable NMR B-value materials. This is further demonstrated in Comparative Example A.

The glass transition temperature has a strong dependence on PTF concentration but (Example 2.1 vs 2.2 vs 2.3 or 2.4 vs 2.5 vs 2.6) does not appear to be dependent on B value (Example 2.1 vs 2.4, 2.2 vs 2.5 or 2.3 vs 2.6) for these very well mixed compositions. The crystallization and melting behavior are markedly different for the highly transesterified blend composition (Examples 2.1-2.3) vs minimally transesterified blend composition (Examples 2.4-2.6). At low B values (less than 0.1) the very blocky transesterified PTF exhibits crystallization and melting at all weight fractions of PTF (Example 2.4-2.9). The $T_{cc}$ appears to increase with B value and $T_m$ appears to decrease. At higher B values (greater than 0.1), the more randomized transesterified PTF (Example 2.1-2.3) exhibits frustration of crystallization and is manifested by the higher $T_{cc}$ and lower $T_m$ and the reduction in enthalpy of these transitions.

By decreasing the processing temperature and reducing the mixing time, transesterification can be even further limited, as demonstrated by Examples 2.7-2.9. The addition of inhibitor at these process temperatures results in a poorly mixed blend indicated by the biphasic $T_g$ behavior. The transesterification peaks in NMR are not observed above acceptable signal-to-noise ratio, and two peaks are observed to elute from IPC. The elution time of the constituent polymer peaks are shifted from their homopolymer analog (as indicated in the brackets below stated elution times), indicating that some small fraction of transesterification exchange reactions have occurred which is not quantifiable by NMR, further demonstrating the sensitivity of this technique.

TABLE 8

Thermal Properties, NMR B values, and IPC Elution Times

| Sample | % PTF (wt %) | Inhibitor (wt %) | $T_g$* (° C.) | $T_{cc}$ (° C.) [$\Delta H_{cc}$ (J/g)] § | $T_m$ (° C.) [$\Delta H_m$ (J/g)] § | B from NMR | IPC Elution Time, PTF-rich [PTF homopolymer] (minutes) † | IPC Elution Time, PET-rich [PET homopolymer] (minutes) † |
|---|---|---|---|---|---|---|---|---|
| Example 2.1 | 10% | 0% | 74.4 | 127.2 [30.9] | 231.3 [30.9] | 0.31 (M1) | 29.93 [28.53 – 30.05] | |
| Example 2.2 | 25% | 0% | 69.2 | 163.0 [5.1] | 199.6 [5.1] | 0.40 (M1) | 29.72 [28.53 – 30.05] | |
| Example 2.3 | 75% | 0% | 58.3 | — | — | 0.75 (M1) | 28.99 [28.53 – 30.05] | |
| Example 2.4 | 10% | 1% | 73.3 | 120.6 [39.0] | 247.1 [39.0] | 0.016 (M2) | 28.82 [28.50] | 29.85 [30.04] |
| Example 2.5 | 25% | 1% | 68.8 | 120.9 [34.0] | 245.7 [34.2] | 0.0094 (M2) | 28.81 [28.50] | 29.68 [30.04] |
| Example 2.6 | 75% | 1% | 57.1 | 142.8 [4] | 214.1 [11.3] | 0.035 (M2) | 28.80 [28.50 – 30.04] | |
| Example 2.7 | 25% | 1% | 55.0, 75.7 | 120.0 [23.7] | 248.6 [29.8] | ND | 29.34 [29.30] | 30.56 [30.66] |

TABLE 8-continued

Thermal Properties, NMR B values, and IPC Elution Times

| Sample | % PTF (wt %) | Inhibitor (wt %) | $T_g$* (° C.) | $T_{cc}$ (° C.) [$\Delta H_{cc}$ (J/g)] § | $T_m$ (° C.) [$\Delta H_m$ (J/g)] § | B from NMR | IPC Elution Time, PTF-rich [PTF homopolymer] (minutes) † | IPC Elution Time, PET-rich [PET homopolymer] (minutes) † |
|---|---|---|---|---|---|---|---|---|
| Example 2.8 | 25% | 1% | 54.6, 76.1 | 120.5 [26.6] | 248.4 [29.2] | ND | 29.35 [29.30] | 30.54 [30.66] |
| Example 2.9 | 25% | 0% | 68.0 | 134.6 [19.6] | 225.6 [25.0] | 0.12 (M1) | 30.30 [29.30 – 30.66] | |

*Value from reversing signal
§ Value from total heat signal
† UV-280 nm (samples 2.1 to 2.6) or 270 nm (samples 2.7 to 2.9) chromatograms Example 3: Controlling Transesterification Via Time for Thermal Exposure All materials were dried at 120° C. overnight under vacuum prior to processing. Blends were prepared in a Brabender Plasti-Corder® Lab-Station in the same manner as Example 2. Samples were collected at mixing times specified in Table 9, which summarizes the melt blending conditions.

TABLE 9

Melt Blending Conditions

| | | Melt Blending Conditions | | | | |
|---|---|---|---|---|---|---|
| Sample | % PTF by weight | Mixing time (min) | Temp Set Point (° C.) | Melt Temp (° C.) | Polymer Charge (g) PTF-2 | PET-2B |
| Example 3.1 | 25% | 1 | 275 | 280 | 12.5 | 37.5 |
| Example 3.2 | 25% | 3 | 275 | 280 | 12.5 | 37.5 |
| Example 3.3 | 25% | 5 | 275 | 280 | 12.5 | 37.5 |
| Example 3.4 | 25% | 10 | 275 | 280 | 12.5 | 37.5 |
| Example 3.5 | 25% | 15 | 275 | 280 | 12.5 | 37.5 |
| Example 3.6 | 25% | 20 | 275 | 280 | 12.5 | 37.5 |
| Example 3.7 | 25% | 25 | 275 | 280 | 12.5 | 37.5 |

B values of the transesterified blends obtained was calculated from NMR in the method described in Example 1, where the peak areas arising from transesterification are determined by either curve deconvolution or integration. Fitting method was selected to provide the best fit to the data, either Method 1 or Method 2. Method 1 is used if the B value is above about 0.12.

Table 10 summarizes data obtained from modulated DSC, blockiness index (B value) calculated from NMR and the elution times obtained from IPC of the transesterified blends obtained at various mixing times from 1 minute to 25 minutes.

TABLE 10

Thermal Properties, NMR B values and IPC Elution Times

| Samples with 25 wt % of PTF | Mixing time (min) | $T_g$* (° C.) | $T_{cc}$ (° C.) [$\Delta H_{cc}$ (J/g)] § | $T_m$ (° C.) [$\Delta H_m$ (J/g)] § | B from NMR | Elution Time, PTF-rich [PTF homopolymer] (minutes) † | Elution Time, PET-rich [PET homopolymer] (minutes) † |
|---|---|---|---|---|---|---|---|
| Example 3.1 | 1 | 57.0, 72.2 | 126.0 [23.0] | 241.2 [28.3] | 0.012 (M2) | 29.52 [29.35] | 30.52 [30.69] |
| Example 3.2 | 3 | 68.2 | 132.3 [18.5] | 231.6 [27.1] | 0.042 (M2) | 29.43 [29.35] | 30.35 [30.69] |
| Example 3.3 | 5 | 68.6 | 140.0 [18.5] | 221.3 [27.0] | 0.18 (M1) | 30.34 [29.35 – 30.69] | |
| Example 3.4 | 10 | 68.7 | 160.4 [6.1] | 202.1 [9.7] | 0.32 (M1) | 30.34 [29.35 – 30.69] | |
| Example 3.5 | 15 | 68.8 | ND | ND | 0 45 (M1) | 30.37 [29.35 – 30.69] | |
| Example 3.6 | 20 | 69.9 | ND | ND | 0 52 (M1) | 30.39 [29.35 – 30.69] | |
| Example 3.7 | 25 | 69.6 | ND | ND | 0.56 (M1) | 30.37 [29.35 – 30.69] | |

*Value from reversing signal
§ Value from total heat signal
† UV-270 nm chromatograms As shown in Table 10 by Example 3.1, transesterification occurs very quickly initially with B values reaching ~0.012 after only a minute of mixing. Examples 3.1 to 3.7 show that the B value increased logarithmically with increase in thermal exposure time and begins to slow after ~15 minutes of exposure time with B values ca. 0.5. In the first 3 minutes, two elutions were observed in Examples 3.1 and 3.2, with their peak maxima shifted from their origin positions and by 5 minutes of exposure, as in Example 3.3, the transesterified blend composition exhibits only a single elution peak. The $T_g$ after a minute of mixing is biphasic as shown by Example 3.1, however after 3 minutes, only a single $T_g$ which is independent of B value is observed for Examples 3.2-3.7.

The crystallization and melting behavior of these transesterified blend compositions is particularly sensitive to the blockiness. At B values at 0.45 and above the cold crystallization is completely inhibited on the timescale of the modulated DSC. The $T_{cc}$ appears to increase linearly before this with an enthalpy that decreases with randomness. The corresponding $T_m$ decreases linearly with increasing B value.

It follows from Example 2 and 3 that a combination of inhibition and control of processing conditions could be used to generate a controlled level of transesterification with melting points ranging from ca. 200° C.-240° C., or even compositions where crystallization is inhibited yielding an amorphous slow crystallizing copolymer. The former case would be useful in applications where a lower melting temperature is desired, while the later would be ideal for situations where slow crystallization is favorable such as heat seal or thermal welding applications. In addition control of the processing conditions combined with variation of the catalyst composition, catalyst concentration, end group concentration, and/or end group composition could also be employed to produce the desired level of transesterification.

Example 4: Increasing Transesterification Via Reprocessing

Transesterified PTF/PET blends were prepared by melt extrusion in a PRISM twin screw co-rotating extruder with a 24:1 L/d ratio. PTF-2 and PET-2B were dried overnight at 120° C. in a vacuum oven with a slight nitrogen purge. The dried polymers were preweighed to the desired blend ratio and were dry blended prior to feeding into the extruder. The melt was extruded at a target rate of 5.6 lbs per hour with a screw speed of 150 rpm and vacuum applied to the barrel. The extruded strand was quenched in a water bath and fed through a pelletizer. The melt temperature was measured by inserting a thermocouple into the extruded melt. The pellets were crystalized at 130 C for 6 h in an air oven and redried overnight at 120° C. to make samples 4.1 and 4.2. The crystallized blend pellets were re-extruded in the same way to increase transesterification and to make samples 4.3 and 4.4 which were also pelletized and crystallized using the same conditions. The extrusion details for the original blends and reprocessed blends are described in Table 11. A PET-2B control was processed in the same way as the control examples 4.C1 and 4.C2.

TABLE 11

Melt Processing Conditions

| | | Barrel 1-4 | Melt Blending Conditions | | | | | Re-Extrusion - Melt Blending Conditions | | | | |
|---|---|---|---|---|---|---|---|---|---|---|---|---|
| | % PTF by | Temperature Set Point | Barrel Temperature (° C.) | | | | Hand Melt Temp | Barrel Temperature (° C.) | | | | Hand Melt Temp |
| Sample | weight | (° C.) | 1 | 2 | 3 | 4 | (° C.) | 1 | 2 | 3 | 4 | (° C.) |
| Control 4.C1 | 0% | 285 | 284 | 286 | 285 | 284 | 300 | — | — | — | — | — |
| Example 4.1 | 20% | 285 | 285 | 283 | 284 | 285 | 284 | — | — | — | — | — |
| Example 4.2 | 10% | 285 | 285 | 283 | 284 | 285 | 300 | — | — | — | — | — |
| Control 4.C2 | 0% | 285 | 285 | 284 | 284 | 285 | 292 | 285 | 284 | 284 | 285 | 292 |
| Example 4.3 | 20% | 285 | 285 | 284 | 284 | 285 | 288 | 285 | 284 | 284 | 285 | 288 |
| Example 4.4 | 10% | 285 | 285 | 286 | 284 | 284 | 303 | 285 | 286 | 284 | 284 | 303 |

Example 4 demonstrated the role of thermal exposure time on the degree of randomness of the copolymer generated in the melt. An increase in thermal exposure time can also be achieved by subsequent melt exposures of the copolymer. In this example an increase in randomization is demonstrated via reprocessing. This would be advantageous in processing conditions such as extrusion where the residence time may be limited. Table 12 summarizes data obtained from modulated DSC, B value calculated from NMR and the elution times obtained from IPC.

TABLE 12

Thermal Properties, NMR B values and IPC Elution Times

| Sample | % PTF | $T_{g1}$* (° C.) | $T_{g2}$* (° C.) | $T_{cc}$ (° C.) [$\Delta H_{cc}$ (J/g)] § | $T_m$ (° C.) [$\Delta H_m$ (J/g)] § | Elution Time, PTF rich [PTF homopolymer] (minutes) † | Elution Time, PET rich [PET homopolymer] (minutes) † |
|---|---|---|---|---|---|---|---|
| Control 4.C1 | 0% | — | 83.3 | 247.9 [42.6] | | ND | 30.17 |
| Example 4.1 | 20% | 52.0 | 66.6 | 241.8 [27.8] | 0.012 (M2) | 28.83 [28.72] | 30.10 [30.17] |
| Example 4.2 | 10% | 50.8 | 78.3 | 246.8 [32.2] | 0.007 (M2) | 28.86 [28.72] | 30.13 [30.17] |
| Example 4.C2 | 0% | — | 81.6 | 249.1 [34.8] | | ND | 30.16 [30.17] |
| Example 4.3 | 20% | 61.6 | — | 242.9 [31.1] | 0.028 (M2) | 29.92 [28.72 – 30.17] | |
| Example 4.4 | 10% | 51.7 | 72.1 | 247.1 [36.2] | 0.015 (M2) | 30.03 [28.72 – 30.17] | |

*Value from reversing signal
§ Value from total heat signal
M2 NMR calculation method used.
† ELSD chromatograms Examples 4.1 and 4.2 in Table 12 shows that after the first processing step, very low B (0.012-0.007) values are observed with two elution times that are shifted from their homopolymer origins. As in Example 2, Examples 4.1 and 4.2 also shows that the B values are dependent on PTF concentration. As shown by Examples 4.3 and 4.4, upon reprocessing, the B values double to 0.028 and 0.015 for 20 and 10% PTF, respectively, and a single elution is observed in IPC supporting the increase in transesterified blend population after further melt exposure. The biphasic $T_g$ also merges into a single $T_g$ for the 20% PTF composition suggesting improved mixing.

Figure 6:
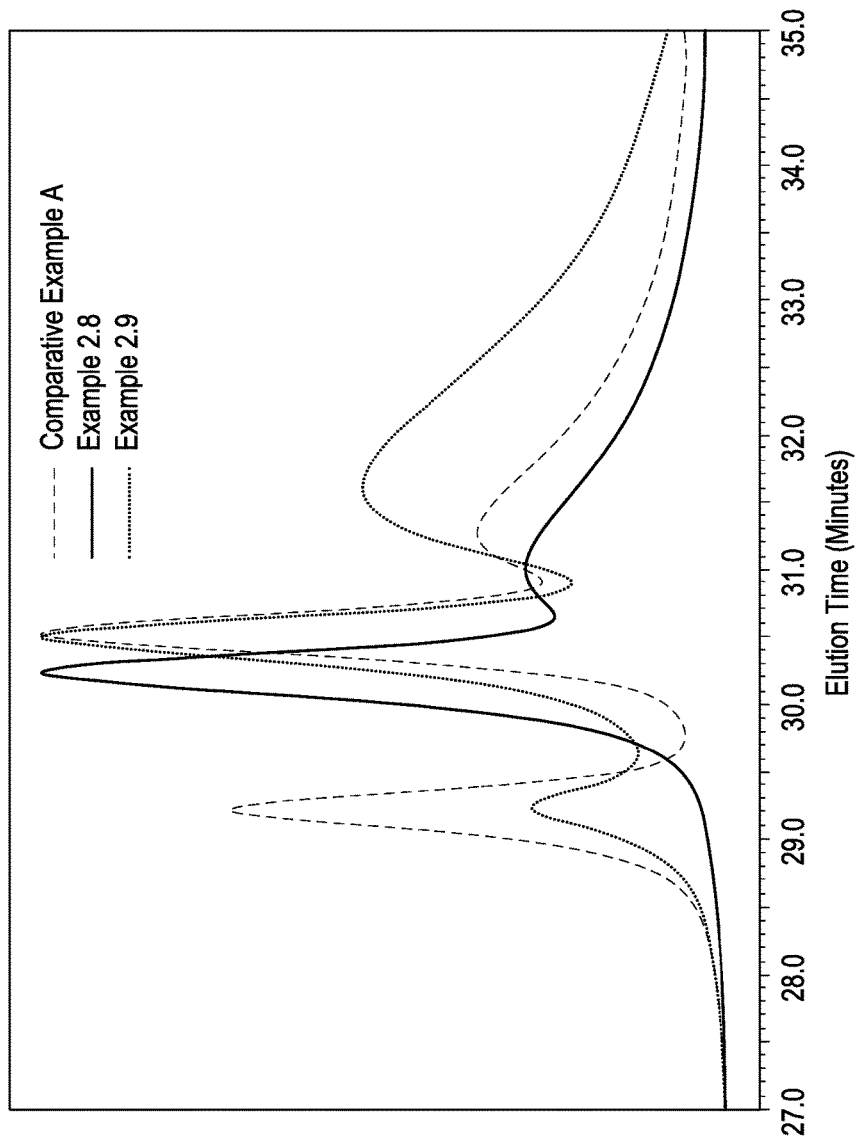
FIG. 6 shows an exemplary interaction polymer chromatography spectrum of (a) dashed line—a solution blend of poly(trimethylene furandicarboxylate) and a poly(ethylene terephthalate); (b) solid line—a transesterified blend composition of poly(trimethylene furandicarboxylate) and poly(ethylene terephthalate) in the presence of 1 wt % inhibitor, with a B value undetectable by NMR; and (c) dotted line—a transesterified blend composition of poly(trimethylene furandicarboxylate) and poly(ethylene terephthalate) in the absence of an inhibitor, with a B value of 0.12.

Comparative Example A: Preparation of a Completely Untransesterified PET/PTF Blend Composition Via Solution Blending A solution blend of Control Example PTF-2 and PET-2B was prepared as a demonstration of zero transesterification. Stock solutions of PTF-2 and PET-2B were prepared at 1 mg/mL in neat HFIP. A blended solution was prepared by the volumetric addition of PTF-2 solution to PET-2B solution, such that the final composition of the solution blend is 25:75 PTF-2:PET-2B on a weight basis. Normalized IPC chromatograms (extracted UV absorbance at 240 nm) in FIG. 6 demonstrate the observable composition change in blends with very low or non-determinable NMR B-value. Inhibited transesterified blend composition (FIG. 6, dotted line) and uninhibited transesterified blend composition (FIG. 6, solid line), prepared with under similar conditions except for the inclusion of inhibitor, is compared with the elution of the solution blend of the same composition (FIG. 6, dashed line). Elution behavior of the uninhibited transesterified blend composition is markedly different; only one peak is observed, and the apex retention time is the compositional average of its homopolymers components. A small but consistent change in elution time and peak shape is observed in the inhibited copolymers. The shift in retention time of the homopolymers-rich peaks towards the transesterified peak indicates a compositional difference in the inhibited transesterified blend composition. The PTF-rich peak at ~29.2 minutes decreases during melt blending, while the valley at ~29.8 minutes increases, relative to the solution blend, indicating increased compositional heterogeneity. PET-2 homopolymers exhibit a second late eluting peak, which is believed to be related to the IPA comonomer. Retention times are given in Table 8.

Comparative Example B: Synthesis of a Statistically Random PTF/PET Copolymer

A statistically random copolymer consisting of 1,3-propanediol, 1,2-ethanediol, FDME, and DMT was synthesized as described below. The copolymerization involving these four monomers involves two inline steps:
(1). Ester interchange: The reaction is conducted in the melt at an elevated temperature of 200° C. in the presence of a transesterification catalyst (Tyzor® TPT) with a slow nitrogen purge. The ester interchange leads to condensation of methanol and was carried out at 200° C. for 2 hours.
(2). Condensation step: The reaction temperature is further increased (T=250° C.) and a vacuum ramp was applied over 30 minutes. Excess glycol is distilled which leads to polymer formation and an increase in molecular weight. Duration for the condensation stage was 3 hours. Final vacuum levels were less than 300 mTorr.

A typical small scale (~50 g polymer) laboratory experimental setup for a copolymerization was done using a three-necked round bottom flask. The flask was connected to a nitrogen inlet/outlet, a high torque mixer, and a distillation condenser. Under a slow nitrogen purge the reactants and catalyst (200 ppm to polymer) were charged into the reaction vessel as summarized in Table 1. The flask was subsequently sealed and heated using an elevated tin/bismuth liquid metal bath to start the initial condensation of methanol via the transesterification route. Once the methanol distillation was completed, the temperature was adjusted to its final set point and the nitrogen purge stopped and a vacuum ramp started for 3 hours at 250° C. Typical vacuum levels of less than 300 mTorr were reached after 3 hours. The polymer was recovered by removing the condenser and nitrogen inlet/outlet and by carefully breaking the reaction vessel.

This synthetically random copolymer exhibits significantly different properties than the blocky copolymers prepared in the melt. At 26 wt % and 49 wt % of PTF crystallization is suppressed and at 9 wt % two $T_m$ values are observed at 125 and 212° C., the highest being 20° C. lower than a melt transesterified copolymer of a B value of ~0.3 (Example 2.1) and ca 35° C. lower than a very blocky copolymer (B=0.016, Example 2.4) for a similar PTF concentration. The B value was confirmed by NMR to be ~1 as expected for a random copolymer from theory. IPC elution of the copolymers found only one narrow peak, eluting with apex retention time equal to the average of its constituent homopolymers. Narrow peaks indicate minimal compositional heterogeneity.

TABLE 13

Final copolymer composition, thermal Properties, and B values from NMR

| Sample - PTF/PET | Final Copolymer Composition (mol %) | | | | FDCA-3G (3F) wt % | IV (dL/g) | $T_g$* (° C.) | $T_m$ (° C.) [$\Delta H_m$ (J/g)] § | B value from NMR | IPC Elution time [PTF − PET homopolymer] (minutes) † |
|---|---|---|---|---|---|---|---|---|---|---|
| | TPA | FDCA | 2G | 3G | | | | | | |
| B.1-50/50 | 0.25 | 0.25 | 0.27 | 0.22 | 49 | 0.45 | 61.8 | ND | ~1 (A1) | 34.42 [34.16 − 35.02] |
| B.2-25/75 | 0.37 | 0.13 | 0.37 | 0.13 | 26 | 0.56 | 60.8 | ND | ~1 (A1) | 34.80 [34.16 − 35.02] |
| B.3-10/90 | 0.45 | 0.04 | 0.46 | 0.05 | 9 | 0.54 | 76.5 | 124.8, 212.2 [33.2] | | ND |

*Value from reversing signal
§ Value from total heat signal
† ELSD chromatograms Example 5: Preparation of Transesterified-Blend Compositions (t-Blend) from PTF and PET-CHDM Containing Copolymers (PET-1) Via Melt Blending In addition to the IPA containing composition of PET the melt transesterification of a CHDM containing PET composition was investigated. Blends were prepared using the DSM microcompounder using the same procedure as Example 1; the melt blending experimental conditions are described in Table 14.

ports this as well. The PET-1A grade used had a significant amount of impurities (summarized in Table 2) likely imparted by the preparation method of this particular material appeared to also have a transesterification reduction effect vs blends prepared with as purchased PET-1B resin pellets.

TABLE 15

Thermal Properties, NMR B values and IPC Elution Times

| Sample | % PTF by weight) | $T_{g1}$ ‡ (° C.) | $T_{g2}$ ‡ (° C.) | $T_{cc}$ (° C.) [$\Delta H_{cc}$ (J/g)] § | $T_m$ (° C.) [$\Delta H_m$ (J/g)] § | B | Elution Time, PTF rich [PTF homopolymer] (minutes) † | Elution Time, PET rich [PET homopolymer] (minutes) † |
|---|---|---|---|---|---|---|---|---|
| Control PET-1A | 0% | ND | 76.8 | 123.2 [27.2] | 245.9 [36.8] | | ND | 34.68 [34.70] |
| Example 5.1 | 25% | 56.8 | 67.7 | 120.4 [26.3] | 244.3 [33.3] | ND*,** (A1, M3); 0.0095 (A2, M2) | 32.85 [32.81] | 34.52 [34.70] |
| Example 5.2 | 50% | 57.3 | 68.2 | 122.9 [19.3] | 240.8 [20.3] | | 32.86 [32.81] | 34.32 [34.70] |
| Example 5.3 | 75% | 57.0 | 70.7 | 132.1 [9.5] | 234.8 [9.1] | | 32.86 [32.81] | 34.50 [34.70] |
| Control PTF-1 | 100% | 56.7 | — | 119.5 [40.2] | 177.2 [36.5] | | 32.79 [32.81] | ND |
| Example 5.4 | 25% | 67.7 | ND | ND | ND | 0.011 (M2) | 29.49 [29.36] | 31.02 [31.27] |
| Example 5.5 | 25% | 55.9 | 73.4 | 126.5 [32.7] | 242.5 [31.9] | 0.028 (M2) | 29.52 [29.36] | 30.90 [31.27] |
| Example 5.6 | 25% | 69.4 | ND | 127.3 [32.6] | 238.0 [37.3] | 0.024 (M2) | 29.47 [29.36] | 30.90 [31.27] |
| Example 5.7 | 25% | 57.3 | 69.4 | 126.8 [25.3] | 237.7 [25.5] | 0.056 (M2) | 30.86 [29.36 – 31.27] | |

*These peaks were only observed at trace levels and were too small to integrate above the signal to noise ratio
**NMR behavior indicated the presence of metal particles in these samples which increased error and decreased resolution in these samples. This was confirmed on previous samples run by the same method and melt processed with same equipment.
† UV-270 nm chromatograms
‡ Value from reversing signal
§ Value from total heat signal

TABLE 14

Melt Blending Conditions

| | Melt Blending Conditions | | | | |
|---|---|---|---|---|---|
| | Mixing time | Extruder Set Point | Polymer Charge (g) | | |
| Sample | (min) | (° C.) | PTF-1 | PTF-2 | PET-1A | PET-1B |
| Control PET-1A | 6 | 265 | 0 | — | 18 | |
| Example 5.1 | 6 | 265 | 4.5 | — | 13.5 | |
| Example 5.2 | 7 | 265 | 9 | — | 9 | |
| Example 5.3 | 6 | 265 | 13.5 | — | 4.5 | |
| Control PTF-1 | 6 | 265 | 18 | — | 0 | |
| Example 5.4 | 5* | 265 | | 4.5 | 13.5 | |
| Example 5.5 | 5 | 265 | | 4.5 | | 13.5 |
| Example 5.6 | 5* | 275 | | 4.5 | 13.5 | |
| Example 5.7 | 5 | 275 | | 4.5 | | 13.5 |

*Due to the large form factor of the bottle flake in these samples the dry blend took longer to load into the instrument (ca. several minutes vs <1 minute)

The thermal properties, B values and elution times from IPC are summarized in Table 15. The B values for similar processing conditions and compositions at PTF concentrations appear to be slightly lower than their IPA containing counterparts in Example 1 at low PTF compositions, suggesting that transesterification is slightly reduced with the presence of CHDM. The presence of two elution peaks with peak maxima shifted from their homopolymer origin, sup- Example 6: Preparation of Highly Transesterified-Blend Compositions (t-Blend) from PTF and PET Containing CHDM (PET-1B) Via Melt Blending Blends were prepared in a Brabender Plasti-Corder® Lab-Station using the same procedure as Example 2. Total charge was 50 g. Melt processing conditions are provided in Table 16.

TABLE 16

Melt Processing Conditions

| | Melt Blending Conditions | | | | |
|---|---|---|---|---|---|
| Sample | % PTF by weight | Mixing time (min) | Temp Set Point (° C.) | Melt Temp (° C.) | Polymer Charge (g) |
| | | | | | PTF-2 | PET-1B |
| Example 6.1 | 10% | 10 | 275 | 290 | 5 | 45 |
| Example 6.2 | 25% | 10 | 275 | 289 | 12.5 | 37.5 |
| Example 6.3 | 75% | 10 | 275 | 277 | 37.5 | 12.5 |

The molecular weight of these copolymers are provided in Table 17. Molecular weight decreases as PTF fraction increases.

TABLE 17

SEC data

| Sample | Mn (kDa) | Mp (kDa) | Mw (kDa) | Mz (kDa) | Polydispersity (Mw/Mn) | dn/dc (mL/g) |
|---|---|---|---|---|---|---|
| Example 6.1 | 22.55 | 53.57 | 50.66 | 76.11 | 2.25 | 0.235 |
| Example 6.2 | 23.43 | 43.81 | 47.14 | 70.02 | 2.01 | 0.234 |
| Example 6.3 | 12.61 | 23.47 | 28.25 | 45.15 | 2.24 | 0.232 |

TABLE 17-continued

| | SEC data | | | | | |
|---|---|---|---|---|---|---|
| Sample | Mn (kDa) | Mp (kDa) | Mw (kDa) | Mz (kDa) | Polydispersity (Mw/Mn) | dn/dc (mL/g) |
| Control PET-1B | 19.64 | 65.3 | 55.25 | 87.27 | 2.81 | 0.235 |
| Control PTF-2 | 20.41 | 39.62 | 51.13 | 84.57 | 2.5 | 0.231 |

The B value, thermal properties, and IPC elution times are summarized in Table 18. As discussed in Example 5 at low PTF concentrations (10 wt %) the IPA containing PET grade appears to transesterify slightly more readily at similar conditions (Example 2.1, B=0.31 vs 0.21 for the CHDM containing PET grade). However, this is not the case at 25 and 75% PTF, where the B values are within error of the analysis used at high B values.

As with the IPA containing grades used in Example 2, Examples 6.1-6.3 shows that for PET grade with CHDM, the B value is also highly dependent on the PTF concentration and only a single elution peak is observed for these highly transesterified copolymers, as summarized in Table 18. The $T_g$ changes relative to PTF concentration and the $T_{cc}$ is suppressed a 75% PTF. $T_m$ decreases from 10-25% PTT and the $T_{cc}$ increases by ca. 30° C. and has an extremely low enthalpy on the timescale of the DSC (~0.2 J/g) for 25% PTF. The randomization of the monomers in the polymer make crystallization more difficult, requiring more energy (a higher temperature) to crystallize. The crystals also require less energy to melt, so the crystals are less stable.

Example 7: Preparation of PEF/PET Transesterified-Blend-Compositions (t-Blend) from PEF and PET Containing PET-2B Via Melt Blending In addition to PET/PTF compositions other furan based transesterified copolymers can be produced. Transesterified blends of PEF and PET-2B were prepared in the same way as Example 2 with mixing conditions provided in Table 19. The control PEF was measured as received.

TABLE 19

| Melt Processing Conditions | | | | | |
|---|---|---|---|---|---|
| | Melt Blending Conditions | | | | |
| | % PEF by | Mixing time | Temperature Set Point | Melt Temp | Polymer Charge (g) | |
| Sample | weight | (min) | (° C.) | (° C.) | PEF | PET-2B |
| Example 7.1 | 25% | 10 | 275 | 288 | 12.5 | 37.5 |
| Example 7.2 | 75% | 10 | 275 | 289 | 37.5 | 12.5 |

The thermal properties, B values and IPC elution times for these compositions are provided in Table 20. These compositions show a similar furan based component dependence on B value, however the PEF/PET copolymers yield higher B values than those observed for PTF/PET at (0.6 at 25% PEF vs 0.4 at 25% PTF, Example 2.2). At 75% the B values are with in error of the analysis. A single IPC elution peak is observed for these polymers. Two $T_g$s are observed at 25% PEF. The melting temperature is depressed by ~20° C. in this composition. At 75% PEF a single Tg is observed and no melting or crystallization is evident.

TABLE 18

| Thermal Properties, NMR B values and IPC Elution Times | | | | | | |
|---|---|---|---|---|---|---|
| Sample | % PTF By weight | $T_g$* (° C.) | $T_{cc}$ (° C.) [$\Delta H_{cc}$ (J/g)] § | $T_m$ (° C.) [$\Delta H_m$ (J/g)] § | B from NMR (Method used) | Elution Time, PTF-rich [PTF homopolymer] (minutes)† | Elution Time, PET-rich [PET homopolymer] (minutes)† |
| Example 6.1 | 10% | 73.8 | 129.1 [29.9] | 232.7 [30.0] | 0.21 (M1) | 30.56 [28.59 – 30.71] | |
| Example 6.2 | 25% | 69.0 | 162.7 [0.2] | 190.8 [0.2] | 0.48 (M1) | 30.23 [28.59 – 30.71] | |
| Example 6.3 | 75% | 58.1 | — | — | 0.84 (M1) | 29.16 [28.59 – 30.71] | |

*Value from reversing signal
§ Value from total heat signal
† UV-280 nm chromatograms

TABLE 20

Thermal Properties, NMR B values and IPC Elution Times

| Sample | % PEF by weight | $T_{g1}$* (°C.) | $T_{g2}$* (°C.) | $T_{cc}$ (°C.) [$\Delta H_{cc}$] (J/g)] § | $T_m$ (°C.) [$\Delta H_m$] (J/g)] § | B value (NMR) | Elution Time, PEF rich [PEF homopolymer] (minutes) † | Elution Time, PET rich [PET homopolymer] (minutes) † |
|---|---|---|---|---|---|---|---|---|
| Example 7.1 | 25% | 62.2 | 78.7 | 162.3 [12.0] | 205.1 [12.0] | 0.6 | 30.11 [26.38 – 30.73] | |
| Example 7.2 | 75% | — | 84.2 | None | none | 0.7 | 28.14 [26.38 – 30.73] | |
| Control PEF | 100% | 62.2 | — | 191.2 [9.8] | 228.5 [47.9] | | 26.38 | ND |

*Value from reversing signal
§ Value from total heat signal
† UV-270 nm chromatograms

Example 8: Preparation of PTT/PTF Transesterified-Blend Compositions (t-Blend) from PTF and PTT Via Melt Blending Transesterified blends of PTT and PTF-2 were prepared in the same way as Example 2 and 4 with the temperature set point lowered to 255° C. due to the lower $T_m$ of PTT. Melt blending details are provided in Table 21.

TABLE 21

Melt Processing Conditions

| | | Melt Blending Conditions | | | | |
|---|---|---|---|---|---|---|
| Sample | % PTF by weight | Mixing time (min) | Temperature Set Point (°C.) | Melt Temp (°C.) | Polymer Charge (g) PTF-2 | PTT |
| Example 8.1 | 75% | 10 | 255 | 263 | 37.5 | 12.5 |
| Example 8.2 | 25% | 10 | 255 | 263 | 12.5 | 37.5 |

The thermal properties, B values and IPC elution times for these compositions are provided in Table 22. It is clear that transesterification is highly favored in the PTT containing composition. Extremely randomized B values are observed (0.97 and 0.9). This may be facilitated by the increased miscibility between the two components or potentially end-group or catalyst transesterification promoting effects. A single $T_g$ and IPC elution peak is observed. At 25% PTF the melting temperature is suppressed by almost 40° C. and the enthalpy of melting is halved.

Measurement of Film Barrier Properties of Transesterified-Blend Compositions (t-Blend) Comprising Transesterified Polymers t-PTF/t-PET and Random Copolymers of PTF and PET PTF/PET-1 blends from the Control Examples A.1-A.3 and the transesterified-blend composition comprising transesterified polymers t-PTF/t-PET from Example 1.1 & 1.2 were analyzed for their permeation towards oxygen and carbon dioxide. FIGS. 6A and 6B shows the permeation coefficient as a function of PTF content in the PTF/PET-1 blend and in the transesterified-blend composition comprising transesterified polymers t-PTF/t-PET respectively. Summarized in Table 5 are permeation results for oxygen and for carbon dioxide.

TABLE 23

Gas Permeability rates for the composition comprising transesterified polymers t-PTF/t-PET

| Sample | Composition of t-Blend (t-PTF-1/ t-PET-2A) (% PTF by weight) | Oxygen Permeability (cc-mil/ m²-day) | % Improvement in Oxygen Permeability by t-blend in PET-2A | $CO_2$ Permeability (cc-mil/ m²-day) | % Improvement in $CO_2$ Permeability by t-Blend in PET-2 |
|---|---|---|---|---|---|
| PET-2A | 0% | 138.22 | | 1034.66 | |
| Example1.1 | 12.5% | 74.17 | 46% | 544.09 | 47% |
| Example1.2 | 25% | 65.24 | 53% | 359.19 | 65% |

TABLE 22

Thermal Properties, NMR B values and IPC Elution Times

| Sample | % PTF by weight | $T_g$* (°C.) | $T_{cc}$ (°C.) [$\Delta H_{cc}$] (J/g)] § | $T_m$ (°C.) [$\Delta H_m$] (J/g)] § | B value (NMR) | Elution Time, PTF rich [PTF homopolymer] (minutes)† | Elution Time, PTT rich [PTT homopolymer] (minutes)† |
|---|---|---|---|---|---|---|---|
| Control PTT | 0% | 88.8 | ND | 226.1 [64.3] | | ND | 31.95 |
| Example 8.1 | 75% | 54.6 | ND | ND | 0.97 | 30.17 [29.38 – 31.95] | |
| Example 8.2 | 25% | 50.0 | 96.7 [28.8], 156.8 [0.58] | 190.0 [30.4] | 0.90 | 31.48 [29.38 – 31.95] | |

*Value from reversing signal
§ Value from total heat signal
† UV-240 nm chromatograms

TABLE 24

Gas Permeability rates for t-PTF/t-PET Blends

| Sample | Composition of t-Blend (t-PTF-1/ t-PET-1A) (% PTF by weight) | Oxygen Permeability (cc-mil/ m²-day) | % Improvement in Oxygen Permeability by PTF/PET-1A blend in PET-1A | CO₂ Permeability (cc-mil/ m²-day) | % Improvement in CO₂ Permeability by PTF/PET-1A blend in PET-1A |
|---|---|---|---|---|---|
| Control PET-1A | 0% | 164.4 | | 984 | |
| Example 5.1 | 25% | 101.7 | 38% | 415 | 58% |
| Example 5.2 | 50% | 47.8 | 71% | 303 | 69% |
| Example 5.3 | 75% | 26.4 | 84% | 146 | 85% |
| Control PTF-1 | 100% | 21.0 | | 110 | |

Figure 8:
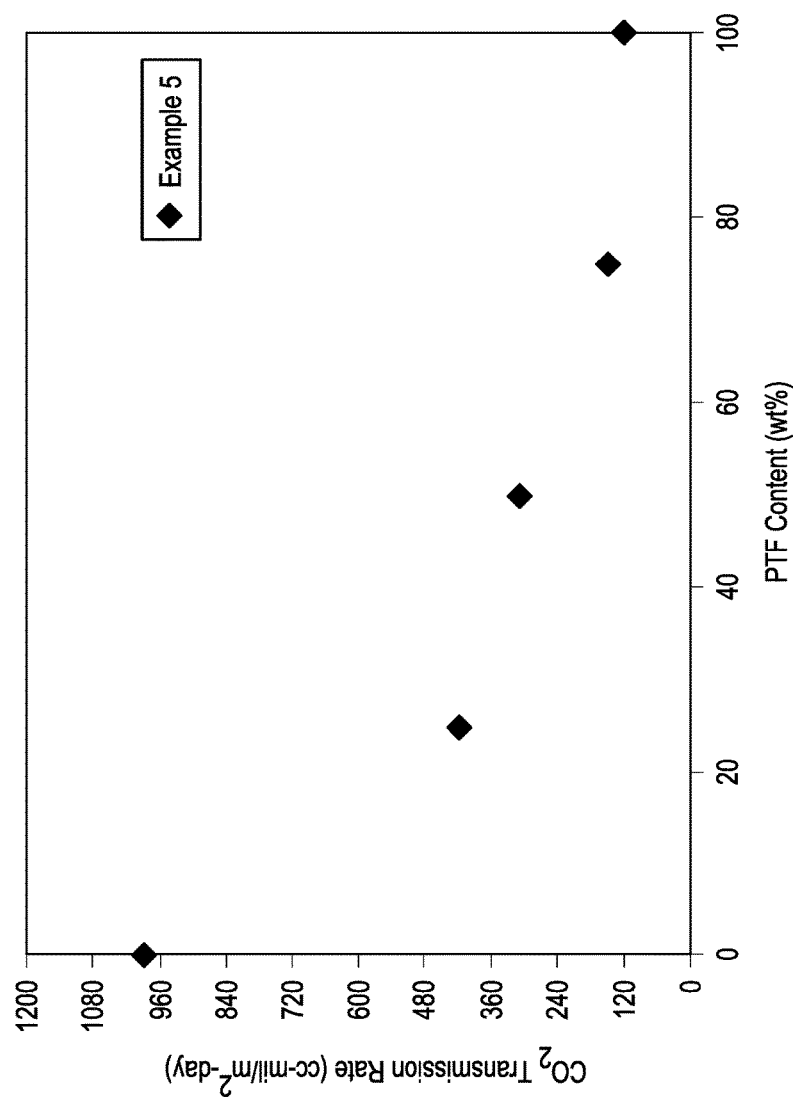
FIG. 8 shows the carbon dioxide transmission rate of a transesterified blend composition of PTF and PET-CHDM as a function of PTF content of the composition.

Tables 23 and 24 show that the barrier properties are improved by the addition of PTF in all transesterified blends. Furthermore, this improvement is dependent on the PTF content, as shown above and in FIG. 7 and FIG. 8.

TABLE 25

Gas Permeability rates for the composition comprising FDCA/EG/TPA/PDO random copolymer

| Sample | Composition of random FDCA/EG/PDO/TPA copolymer, i.e PTF/PET copolymer (% PTF by weight) | Oxygen Permeability (cc-mil/m²-day) |
|---|---|---|
| Control PET-2A | 0% | 138.22 |
| Control PET-1A | 0% | 164.4 |
| Comparative B.3 | 9% | 145.39 |
| Example 2.1 | 10% | 114.5386, 118.2997 |
| Example 1.1 | 12.5% | 74.17 |
| Comparative B.1 | 49% | 89.19 |
| Example 5.2 | 50% | 47.8 |
| Control PTF-1 | 100% | 21.0 |

Furthermore, Table 25 shows that increasing the FDCA/PDO i.e PTF content from 10% to 50% in the random copolymer (B.3 to B.1) showed improvement in barrier (145.39 to 89.19 cc-mil/m²-day). However, surprisingly the improvement in barrier is less than what is achieved from a corresponding transesterified blend, e.g. Compare oxygen permeability of comparative example B.3 (145.39 cc-mil/m²-day) with that of example 2.1 (~116 cc-mil/m²-day) with 10 wt % PTF or comparative example B.1 (89.19 cc-mil/m²-day) with that of example 5.2 (47.8 cc-mil/m²-day) with 50 wt % PTF.

TABLE 26

Gas Permeability rates for the composition comprising PET/PTF transesterified polymer blends

| Sample | Composition of t-Blend (t-PTF-2/ t-PET-2B) (% PTF by weight) | B value from NMR | Amount of NaH₂PO₄ as Inhibitor (wt %) | Oxygen Permeability (cc-mil/ m²-day) |
|---|---|---|---|---|
| Control PET-2A | 0% | — | — | 138.22 |
| Example 2.1 | 10% | 0.31 (M1) | 0% | 114.5386 118.2997 |
| Example 2.2 | 25% | 0.40 (M1)) | 0% | 85.74295 92.03923 |

TABLE 26-continued

Gas Permeability rates for the composition comprising PET/PTF transesterified polymer blends

| Sample | Composition of t-Blend (t-PTF-2/ t-PET-2B) (% PTF by weight) | B value from NMR | Amount of NaH₂PO₄ as Inhibitor (wt %) | Oxygen Permeability (cc-mil/ m²-day) |
|---|---|---|---|---|
| Example 2.3 | 75% | 0.75 (M1) | 0% | 32.95859 34.78629 |
| Example 2.4 | 10% | 0.016 (M2) | 1.0% | 105.7917 115.4375 |
| Example 2.5 | 25% | 0.0094 (M2) | 1.0% | 72.21579 82.65535 |
| Example 2.6 | 75% | 0.035 (M2) | 1.0% | 30.41751 30.90837 |

Table 26 shows that the transesterified blends formed with or without inhibitor provide improvement in barrier to oxygen as compared to nascent PET. The results show unexpected exponential barrier improvement with both high and low B values, which is better than that obtained in FDCA/TPA/PDO/EG random copolymers, a linear improvement in oxygen gas barrier.

The invention claimed is:

1. A composition comprising:
   a. a transesterified furan-based polyester comprising first-alkylene furandicarboxylate repeat units ($R^1F$) and one or more of a second-alkylene furandicarboxylate repeat unit ($R^2F$), a first-alkylene terephthalate repeat unit ($R^1T$), and a second-alkylene terephthalate repeat unit ($R^2T$); and
   b. a transesterified terephthalate-based polyester comprising second-alkylene terephthalate repeat unit ($R^2T$) and one or more of a first-alkylene terephthalate repeat unit ($R^1T$), a second-alkylene furan repeat unit ($R^2F$), and a first-alkylene furandicarboxylate repeat units ($R^1F$);
   wherein the first-alkylene group ($R^1$) and the second-alkylene group ($R^2$) are independently selected from a $C_2$ to $C_{12}$ aliphatic group, and
   wherein the composition has an NMR blockiness index of greater than 0.00 and less than 1.00.

2. The composition of claim 1, wherein the composition shows a shift in one or more elution times as measured by interaction polymer chromatography, from at least one of:
   a corresponding untransesterified furan-based polyester comprising the first-alkylene furandicarboxylate repeat units ($R^1F$), or a corresponding untransesterified terephthalate-based polyester comprising the second-alkylene terephthalate repeat unit ($R^2T$), poly(second-alkylene terephthalate).

3. The composition of claim 1, wherein the transesterified furan-based polyester is present in an amount in the range of 0.1-99.9 weight %, based on the total weight of the composition.

4. The composition of claim 1, further comprises another transesterified furan-based polyester comprising a third-alkylene furandicarboxylate repeat unit ($R^3F$), and one or more of a first-alkylene furandicarboxylate repeat unit ($R^1F$), a second-alkylene furandicarboxylate repeat unit ($R^2F$), a third-alkylene terephthalate repeat unit ($R^3T$), and a second-alkylene terephthalate repeat unit ($R^2T$), wherein the third-alkylene group ($R^3$) is selected from a $C_2$ to $C_{12}$ aliphatic group.

5. The composition of claim 1, further comprises another transesterified terephthalate-based polyester comprising a fourth-alkylene terephthalate repeat unit ($R^4T$) and one or more of a first-alkylene terephthalate repeat unit ($R^1T$), second-alkylene terephthalate repeat unit ($R^2T$), a fourth-alkylene furandicarboxylate repeat unit ($R^4F$), and a first-alkylene furandicarboxylate repeat unit ($R^1F$), wherein the fourth-alkylene group ($R^4$) is selected from a $C_2$ to $C_{12}$ aliphatic group.

6. The composition of claim 1, wherein $R^1$ is a trimethylene group and $R^2$ is an ethylene group, such that:
   i. the first-alkylene furandicarboxylate repeat unit ($R^1F$) is trimethylene furandicarboxylate repeat unit (3F),
   ii. the second-alkylene furandicarboxylate repeat units ($R^2F$) is ethylene furandicarboxylate repeat units (2F),
   iii. the first-alkylene terephthalate repeat unit ($R^1T$) is trimethylene terephthalate repeat unit (3T),
   iv. the second-alkylene terephthalate repeat unit ($R^2T$) is ethylene terephthalate repeat unit (2T),
   v. the transesterified furan-based polyester is transesterified poly(trimethylene furandicarboxylate) (t-PTF),
   vi. the transesterified terephthalate-based polyester is transesterified poly(ethylene terephthalate) (t-PET), and
   vii. the corresponding untransesterified furan-based polyester is poly(trimethylene furandicarboxylate) (PTF).

7. The composition of claim 1 further comprising an effective amount of a transesterification inhibitor or a transesterification catalyst.

8. An article comprising the composition of claim 1, wherein the article is in the form of a sheet, a film or a molded article.

9. The article of claim 8, wherein the composition provides a substantial gas barrier to at least one of oxygen, carbon dioxide or moisture.

10. The article according to claim 8, wherein the article is a beverage container.

11. A multilayer structure comprising the composition of claim 1 in at least one of a barrier layer or a structural layer.

12. The multilayer structure of claim 11, wherein the multilayer structure is in a form of a housing provided with a port for introducing a chemical in an enclosure defined by the housing.

13. The multilayer structure of claim 11 in a form of a hollow body selected from a group consisting of a hose, a pipe, a duct, a tube, a tubing or a conduit.

14. A method of improving gas barrier properties of a composition comprising a terephthalate-based polyester, comprises the step of:
   melt blending 0.1-99.9% by weight of a poly(first-alkylene furandicarboxylate) ($PR^1F$) with 0.1-99.9% by weight of a poly(second-alkylene terephthalate) ($PR^2T$) at a melt blending temperature and a melt blending time to form a transesterified blend composition,
   wherein the melt blending time is minimum time required for the transesterified blend composition to have a desired degree of transesterification, as determined by at least one of:
   an NMR blockiness index of greater than 0.00 and less than 1.00, or
   a shift in one or more IPC elution times from at least one of the poly(first-alkylene furandicarboxylate) or poly(second-alkylene terephthalate),
   wherein the melt blending temperature is in the range of extrusion processing temperatures of the poly(first-alkylene furandicarboxylate) and the poly(second-alkylene terephthalate),
   wherein the poly(first-alkylene furandicarboxylate) ($PR^1F$) is derived from 2,5-furan dicarboxylic acid or a derivative thereof and at least one of a $C_2$ to $C_{12}$ aliphatic diol or a polyol monomer, and optionally at least one of a polyfunctional aromatic acid or a hydroxyl acid, and
   wherein the poly(second-alkylene terephthalate) is derived from a terephthalic acid or a derivative thereof, a $C_2$-$C_{12}$ aliphatic diol or a polyol monomer and optionally isophthalic acid or a derivative thereof.

15. The method of claim 14, wherein the step of melt blending 0.1-99.9% by weight of a poly(first-alkylene furandicarboxylate) ($PR^1F$) with 0.1-99.9% by weight of a poly(second-alkylene terephthalate) ($PR^2T$) is carried out in the presence of an effective amount of a transesterification inhibitor or a transesterification catalyst to further control the transesterification, and thereby blockiness index.

\* \* \* \* \*